TAPE TRANSPORT SERVOMECHANISM UTILIZING DIGITAL TECHNIQUES

Filed Sept. 26, 1966 Sheet 1 of 12

INVENTOR.
MAROLD H. LOHRENZ
BY
Moody and Phillion
ATTORNEYS

INVENTOR.
MAROLD H. LOHRENZ
BY
Moody and Phillion
ATTORNEYS

INVENTOR.
MAROLD H. LOHRENZ
BY Moody and Phillion
ATTORNEYS

TRUTH TABLE

| | COLUMN POSITION | SENSOR (0=OFF, 1=ON) $S_1$ | $S_2$ | $S_3$ | $S_4$ | $S_5$ | $S_6$ | $S_7$ | $S_8$ | $S_9$ | $S_{10}$ | $S_{11}$ | $S_{12}$ |
|---|---|---|---|---|---|---|---|---|---|---|---|---|---|
| TAPE AT TOP | C00L | 1 | 1 | 1 | 1 | 1 | 1 | 1 | 1 | 1 | 1 | 1 | 1 |
| | C01L | 0 | 1 | 1 | 1 | 1 | 1 | 1 | 1 | 1 | 1 | 1 | 1 |
| | C02L | 0 | 0 | 1 | 1 | 1 | 1 | 1 | 1 | 1 | 1 | 1 | 1 |
| | C03L | 0 | 0 | 0 | 1 | 1 | 1 | 1 | 1 | 1 | 1 | 1 | 1 |
| | C04L | 0 | 0 | 0 | 0 | 1 | 1 | 1 | 1 | 1 | 1 | 1 | 1 |
| | C05L | 0 | 0 | 0 | 0 | 0 | 1 | 1 | 1 | 1 | 1 | 1 | 1 |
| | C06L | 0 | 0 | 0 | 0 | 0 | 0 | 1 | 1 | 1 | 1 | 1 | 1 |
| | C07L | 0 | 0 | 0 | 0 | 0 | 0 | 0 | 1 | 1 | 1 | 1 | 1 |
| | C08L | 0 | 0 | 0 | 0 | 0 | 0 | 0 | 0 | 1 | 1 | 1 | 1 |
| | C09L | 0 | 0 | 0 | 0 | 0 | 0 | 0 | 0 | 0 | 1 | 1 | 1 |
| | C10L | 0 | 0 | 0 | 0 | 0 | 0 | 0 | 0 | 0 | 0 | 1 | 1 |
| | C11L | 0 | 0 | 0 | 0 | 0 | 0 | 0 | 0 | 0 | 0 | 0 | 1 |
| TAPE AT BOTTOM | C12L | 0 | 0 | 0 | 0 | 0 | 0 | 0 | 0 | 0 | 0 | 0 | 0 |

INVENTOR.
MAROLD H. LOHRENZ
BY
Moody and Phillion
ATTORNEYS

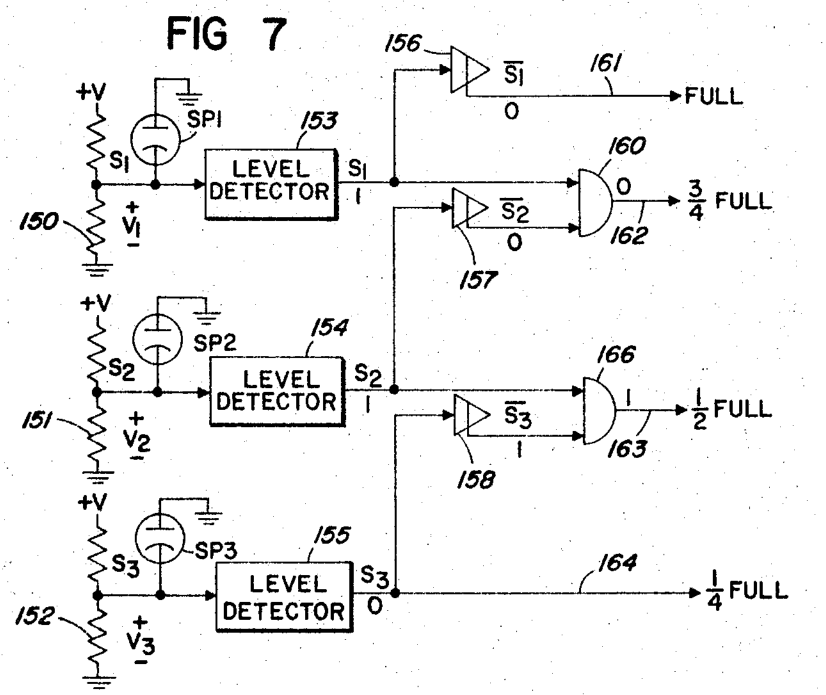
FIG 7
| TRUTH TABLE 0=OFF, 1=ON | | | |
|---|---|---|---|
| TAPE PACK | $S_1$ | $S_2$ | $S_3$ |
| $0-\frac{1}{4}$ FULL | 1 | 1 | 1 |
| $\frac{1}{4}-\frac{1}{2}$ FULL | 1 | 1 | 0 |
| $\frac{1}{2}-\frac{3}{4}$ FULL | 1 | 0 | 0 |
| $\frac{3}{4}$ – FULL | 0 | 0 | 0 |
LOGIC EQUATION
$\frac{1}{4}$ FULL $= S_3$
$\frac{1}{2}$ FULL $= S_2 \cdot \bar{S}_3$
$\frac{3}{4}$ FULL $= S_1 \cdot \bar{S}_2$
FULL $= \bar{S}_1$
FIG 8
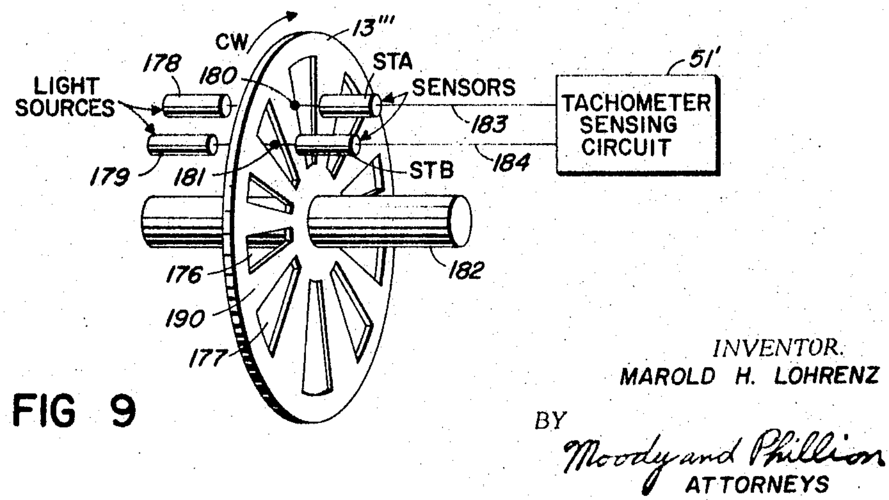
FIG 9
INVENTOR.
MAROLD H. LOHRENZ
BY Moody and Phillion
ATTORNEYS INVENTOR.
MAROLD H. LOHRENZ
BY Moody and Phillips
ATTORNEYS

| | DIRECTION FF | TACH COUNTER BIT 4 | TACH COUNTER BIT 2 | TACH COUNTER BIT 1 | TACH OUTPUT LEVEL | ACTUAL ANGULAR VELOCITY RADIANS PER SECOND |
|---|---|---|---|---|---|---|
| | 1 | 1 | 1 | 1 | 7L | 77 TO 88 |
| | 1 | 1 | 1 | 0 | 6L | 66 TO 77 |
| | 1 | 1 | 0 | 1 | 5L | 55 TO 66 |
| | 1 | 1 | 0 | 0 | 4L | 44 TO 55 |
| | 1 | 0 | 1 | 1 | 3L | 33 TO 44 |
| | 1 | 0 | 1 | 0 | 2L | 22 TO 33 |
| | 1 | 0 | 0 | 1 | 1L | 11 TO 22 |
| | 1 | 0 | 0 | 0 | 0L | 0 TO 11 |
| CW | 0 | 0 | 0 | 0 | 0L | -(0 TO 11) |
| CW | 0 | 0 | 0 | 1 | 1L | -(11 TO 22) |
| CW | 0 | 0 | 1 | 0 | 2L | -(22 TO 33) |
| CW | 0 | 0 | 1 | 1 | 3L | -(33 TO 44) |
| CW | 0 | 1 | 0 | 0 | 4L | -(44 TO 55) |
| CW | 0 | 1 | 0 | 1 | 5L | -(55 TO 66) |
| CW | 0 | 1 | 1 | 0 | 6L | -(66 TO 77) |
| CW | 0 | 1 | 1 | 1 | 7L | -(77 TO 88) |

INVENTOR.
MAROLD H. LOHRENZ
BY Moody and Phillion
ATTORNEYS

INVENTOR.
MAROLD H. LOHRENZ
BY Moody and Phillion
ATTORNEYS

INVENTOR.
MAROLD H. LOHRENZ
BY Moody and Phillion
ATTORNEYS

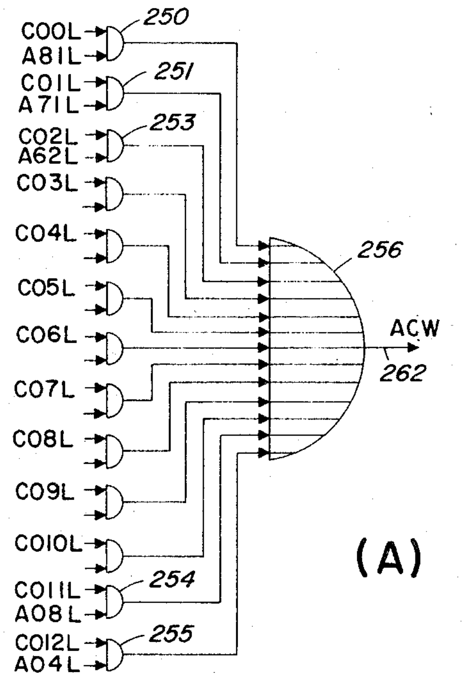
FIG 16
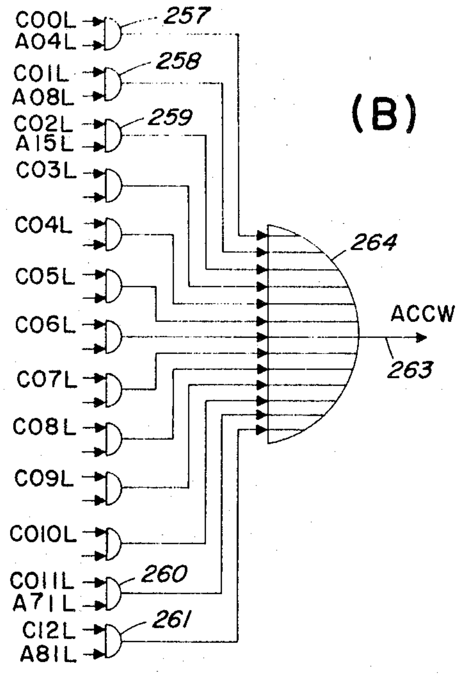
INVENTOR.
MAROLD H. LOHRENZ
BY
Moody and Phillion
ATTORNEYS

| COLUMN LEVEL | PACK DENSITY $\frac{1}{4}$ FULL | $\frac{1}{2}$ FULL | $\frac{3}{4}$ FULL | FULL |
|---|---|---|---|---|
| C00L | P7L | P6L | P5L | P4L |
| C01L | P6L | P5L | P4L | P3L |
| C02L | P5L | P4L | P3L | P2L |
| C03L | P4L | P3L | P2L | P1L |
| C04L | P3L | P2L | P1L | P1L |
| C05L | P2L | P1L | P1L | P1L |
| C06L | | | | |
| C07L | N2L | N1L | N1L | N1L |
| C08L | N3L | N2L | N1L | N1L |
| C09L | N4L | N3L | N2L | N1L |
| C10L | N5L | N4L | N3L | N2L |
| C11L | N6L | N5L | N4L | N3L |
| C12L | N7L | N6L | N5L | N4L |
FIG 18
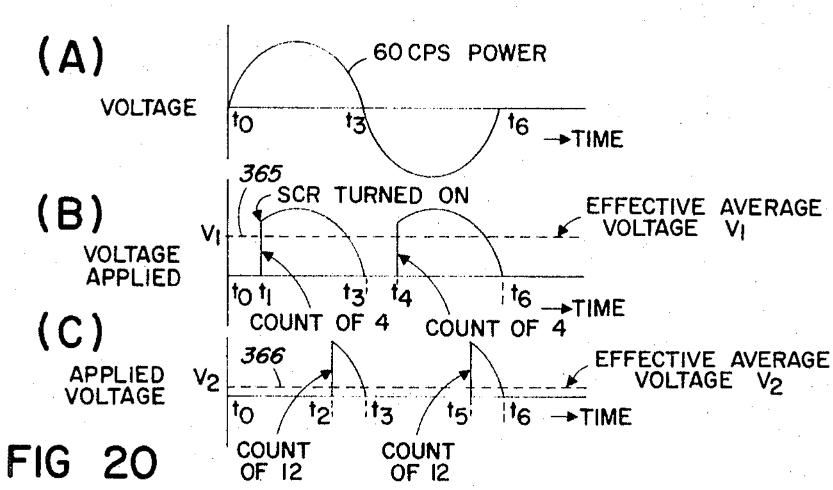
FIG 20
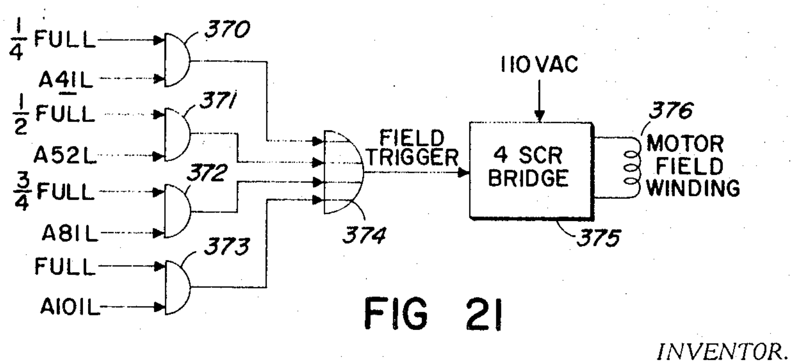
FIG 21
INVENTOR.
MAROLD H. LOHRENZ
BY Moody and Phillips
ATTORNEYS INVENTOR.
MAROLD H. LOHRENZ
BY
Moody and Phillion
ATTORNEYS United States Patent Office 3,454,960

Patented July 8, 1969

3,454,960

TAPE TRANSPORT SERVOMECHANISM UTILIZING DIGITAL TECHNIQUES

Marold H. Lohrenz, Marion, Iowa, assignor to Collins Radio Company, Cedar Rapids, Iowa, a corporation of Iowa Filed Sept. 26, 1966, Ser. No. 581,918
Int. Cl. G11b *15/20, 15/44*
U.S. Cl. 242—184 10 Claims

ABSTRACT OF THE DISCLOSURE

A digitalized tape transport means with first and second take-up reel means, capstan means, buffer tape storage means between each take-up reel and the capstan, a controllable power supply, servo means for controlling angular velocity and direction of each take-up reel means for producing discrete signals in response to the amount of tape in buffer storage, the amount of tape on the reels, and the angular velocity and direction of take-up reels; and digital logic control circuits responsive to said discrete signals to digitally control the output from the controllable power supply which is supplied to said servo means, thus accurately controlling the angular velocity and direction of the take-up reels by digital means.

This invention relates generally to control means for controlling the velocity of the tape reel driving means of a tape transport and, more specifically, it relates to a digitalized control for controlling tape reel drive velocity.

In the more sophistical tape transports complex controls are required to regulate the angular velocity of the tape reel driving means. The primary objective of these controls is to insure that the tape will pass by the reading and writing heads at a constant, predetermined speed and, further, that the tape can be stopped in a short period of time, as for example two or three milliseconds, and can then be accelerated up to a normal operating speed, in either direction, in two or three milliseconds.

There are several mechanisms currently available which can either brake or accelerate the capstan drive shaft itself within the two or three millisecond time period. However, the tape reels and the motor driving the tape reels are much bulkier than the capstan element and require considerably more time to brake or to change direction of velocity. Such time is of the order of 100 milliseconds.

Thus there must be some kind of storage buffer between that portion of the tape passing over the read and write heads and that portion of the tape being wound onto a reel or unwound from a reel. In modern tape transports such a buffer is frequently in the form of two vacuum columns, one positioned on either side of the read and write heads. These vacuum columns store an appreciable length of tape and, with the proper controls, can accommodate the difference in operating times between the capstan drive and the tape reels, while at the same time maintaining a constant tension on the tape as it passes over the read and write heads. The principal problem is as follows. When the tape capstan is stopped or the direction thereof reversed, the amount of tape stored in the vacuum chambers will change rather abruptly since considerably more time is required to stop the tape reels or change their direction. Some means is required to sense the change in the amount of tape in the vacuum chambers and to cause the tape reel drives to either slow down or speed up accordingly to restore the proper amount of tape storage in the vacuum columns.

The amount of change of velocity of the tape reel drive required to maintain a predetermined amount of tape storage in the vacuum columns varies with the amount of tape stored on the reels. Obviously, if a reel is fully wound a considerably less angular velocity is required to maintain a given lineal velocity of the tape than if the reel were nearly empty. Thus, to maintain a desired amount of tape storage in the columns the amount of tape stored on the reel, herein defined as the pack density of a reel of tape, must be taken into consideration.

Another factor which must be considered in a tape stand servo system is the acceleration of the tape reels. If a tape reel is accelerated too fast, for example, the inertia of the system will tend to cause tape to either tighten on the reel or to loosen on the reel depending upon which direction acceleration is occurring. If the tape tightens upon the reel, the tape surfaces may rub upon each other and possibly destroy or impair the information stored thereon. On the other hand, if the tape is loosened, a buckling, with subsequent damage of the tape, might occur. Thus tape reel acceleration must be controlled. It should be noted that the less the pack density of a reel, the less acceleration is permissible.

In summary, then, there are three principal factors which must be considered in controlling the tape reel drive speed. They are as follows:

(1) The tape in the vacuum columns must stay within certain limits, depending upon which direction the tape reel is rotating.

(2) The angular velocity of the tape reels must be adjusted in accordance with the pack density of a reel to follow the constant linear velocity of the tape, and so that the amount of tape in the vacuum column is maintained at the proper level.

(3) The angular acceleration of the tape reel drives must not exceed a certain value, which value is determined primarily by the pack density of the tape reels.

In the prior art the maintaining of the tape at the proper level in the vacuum column has been accomplished by analog means as, for example, by a series of optical devices such as photoelectric cells positioned along the side of the vacuum columns and joined together by a long voltage dividing resistor. As the tape moves up and down the vacuum chamber, either more or fewer of the photoelectric cells will complete electrical circuits and will generate D-C voltages along the voltage divider, the magnitudes of which voltages indicate the tape level in the column. Such D-C voltage is then supplied to a D-C amplifier where it is amplified sufficiently to operate a controlled rectifying circuit such as, for example, a silicon controlled rectifier (SCR), the output of which drives the motors, which in turn drive the tape reel. It should be noted that in most cases, when the analog voltage of prior art devices is employed to control an SCR circuit, output of the SCR circuit ordinarily is employed to generate the larger voltages necessary to energize the tape reel driving motors.

In some prior art devices mechanical means, such as spring means, have been employed to measure the amount of tape on a tape reel. The analog signal from such sensing means, in cooperation with the column level sensing signal, has then been employed to control the tape reel driving means.

Such prior art devices exhibit certain disadvantages in that precise control of the tape driving means has not been obtainable therewith. More specifically, such prior art systems have exhibited overshoot wherein either too much tape or too little tape is stored in the vacuum columns at certain times. If too little tape is being supplied into the vacuum columns, obviously, the velocity of tape passing the reading and writing heads cannot remain constant. On the other hand, if too much tape accumulates in the vacuum column the vacuum column can no longer perform its function of maintaining a constant tension on the tape passing by the reading and writing heads.

Another disadvantage found in prior art control systems is an excessive amount of acceleration in the tape reels which, as discussed above, produces a cinching or buckling of the tape, depending upon the direction of excess acceleration.

Most of the prior art control systems also have a degree of moving parts, as for example, spring means for detecting the amount of tape remaining on a tape reel. Such mechanical parts introduce into the systems maintenance problems and, in general, problems of reliability, An additional disadvantage of analog systems lies in the fact that the characteristics of servo motors are nonlinear, and the relation of tape drive to column density also is nonlinear, since it varies as the pack density of the tape reel. Such nonlinear characteristics are difficult to handle with analog voltages which are derived, for example, from a voltage divider, which is essentially a linear device. The characteristics of nonlinearity in the system lead to such problems as overshooting and excessive acceleration, particularly during reversal of the tape.

It is an object of the present invention to provide a digitalized control circuit means for precisely controlling the servo mechanism which drives the tape reels in a magnetic tape transport.

A second purpose of the invention is a gentle operating, repeatable, and predictable digitalized means for handling the various size tape reels used on magnetic tape transports.

A third object of the invention is a complete servo system means, free of moving mechanical mechanisms, and which functions to control precisely the servo motor drives for the tape reels of a magnetic tape transport.

A fourth object of the invention is a servo means for controlling the tape reel velocity of a magnetic tape transport, which servo means is comprised of non-moving means for detecting vacuum column level of the tape, pack density of the tape reels, and the angular velocity of the tape reels, all in digital form.

A fifth object of the invention is a preprogrammed servo means for controlilng the tape reel drive velocity of a magnetic tape transport, which preprogrammed servo means is comprised of non-moving means for detecting the level of the tape in the vacuum columns, the pack density of the tape reels, and the tape reel speed, all in digital terms, and control circuit means responsive to said digital signals and in accordance with said preprogramming to control the velocity of said tape reel drives.

A sixth purpose of the invention is the improvement of tape reel drives for magnetic tape transports, generally.

In accordance with the invention there is provided a tape transport comprised of a capstan with a vacuum column on either side thereof. Associated with each vacuum column is a tape reel which is driven by a servo motor which either feeds tape into the vacuum column or draws tape from the vacuum column, depending upon the direction of the tape passing the capstan, as determined by the rotation of said capstan. There is also provided a sensing system and a control circuit for each of the servo motors associated with the two tape reels. Each sensing system is comprised of a sensing means for digitally detecting the level of the tape in an associated vacuum column, a sensing means for digitally detecting the amount of tape on the tape reel, a sensing means for digitally determining the angular velocity of said tape reel, and a sensing means for digitally determining the direction of velocity of said tape reel.

The control circuit senses the column level of the tape, the angular velocity of the tape reel, the direction of velocity of the tape reel, and the pack density of the tape reel and compares the sensed signals with preprogrammed logic contained in sai dcontrol circuit to determine whether the servo motor is going too fast or too slow or in right direction for the given conditions which have been sensed. If the motor, for example, is going too fast in a clockwise direction for the sensed conditions, then the control circuit will function to supply a voltage to the armature of said servo motor of a polarity as to decelerate said servo motor. In other words, a voltage will be supplied to the servo motor armature which will tend to provide a counterclockwise torque to said servo motor. The counterclockwise torque might not reverse the motor but might only slow the motor somewhat, depending upon the particular conditions sensed at a given time.

For any given level of tape in the vacuum column and at any given pack density, the tape reel should be rotating in a given direction at a given speed, regardless of the direction of rotation of the capstan, although as a practical matter, at almost all times the direction of rotation of the tape reels will correspond to the direction of rotation of the capstan.

It should be noted that for any given column level of the tape the required velocity of the tape reel decreases as the pack density increases. Thus, although for a given column level a given speed might be sufficient for a full pack, a greater speed would be required (by program) for a pack that is, for example, only one-quarter full. In the latter event a voltage would be supplied from the control circuit to the servo motor to accelerate said servo motor towards the programmed velocity.

The above described and other objects and features of the invention will be more fully understood from the following detailed description thereof when read in conjunction with the drawings, in which:

FIG. 1 is a functional drawing showing the general arrangement of the invention and the relationship between the various elements thereof, including the capstan, the two tape reels, the vacuum columns, and the sensing means such as the column level sensing means, pack density sensing means and tape reel velocity sensing means, the control circuits, and the servo motors, and with the tape reels and capstan shown rotating in a clockwise direction;

FIG. 7 is a logic diagram for obtaining the pack sense signals;

FIG. 8 is a truth table for the logic diagram of FIG. 7;

FIG. 9 shows the disc and associated sensors employed to generate the signals representative of the angular velocity of the tape reel;

FIG. 16 is a logic diagram showing the relationship of the various column levels and the associated firing time of the SCR's of the bridge circuit controlling the servo motor, both for clockwise direction driving torque and for counterclockwise direction driving torque;

Figure 17:
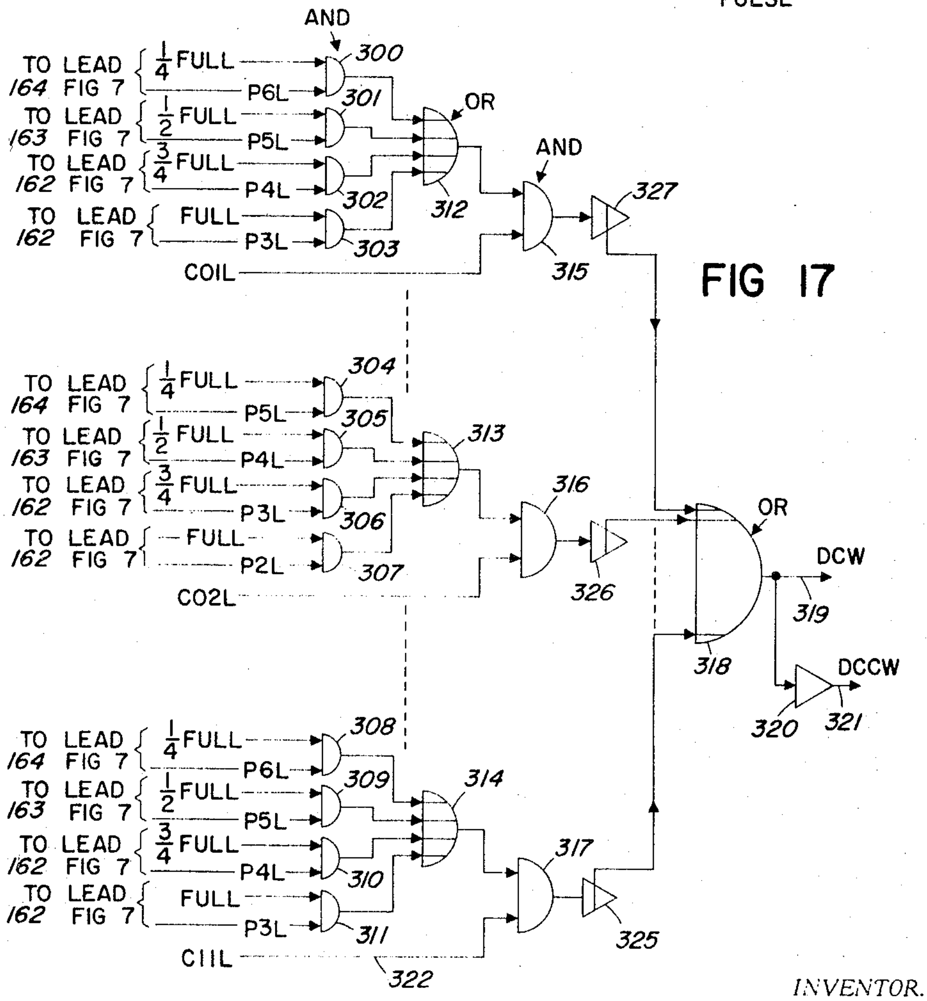
Figure 19:
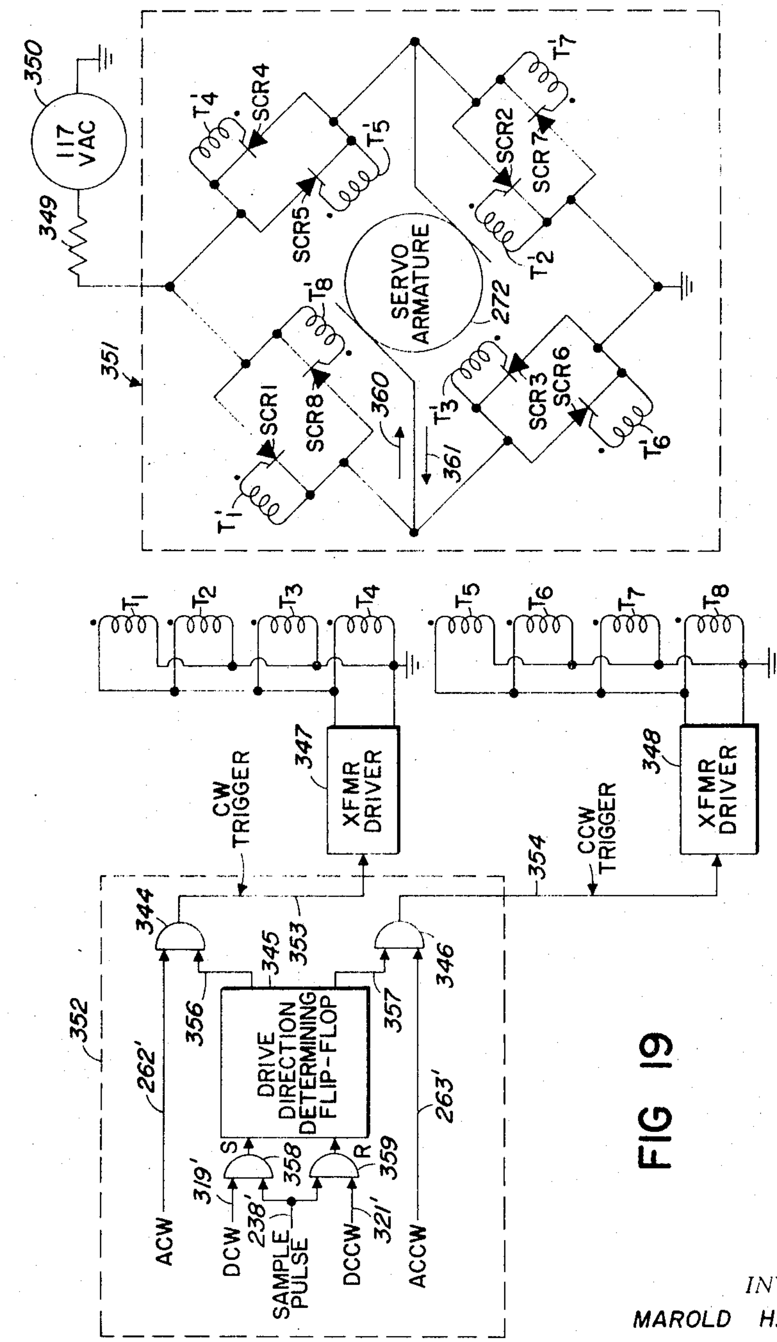

FIG. 17 is a logic diagram showing the relation between the column level, the pack sense level and the actual speed or angular velocity of a tape reel at any given instant in time for determining whether the voltage applied to the servo motor armature should be of a polarity to drive the servo motor clockwise or counterclockwise. The logic diagrams of FIGS. 16 and 17 are employed to produce the input signals supplied to the circuit of FIG. 14;

FIG. 18 is a chart showing a complete organization of the logic which is only partly shown in FIG. 17;

FIG. 19 shows a double bridge circuit employing silicon controlled rectifiers which can be fired to supply a rectified voltage across the armature of the servo motor of either polarity, and of a magnitude depending upon the nature of the firing pulses supplied thereto, and further shows a logic diagram which responds to previously made decisions to supply to said double bridge circuit firing pulses of a nature to cause said servo motor to rotate either clockwise or counterclockwise with a predetermined torque;

FIG. 20 is a series of voltage waveforms showing the relation of the D-C voltage with the points in time at which the SCR's of the bridge circuit controlling the servo motors are fired; and FIG. 21 is a logic diagram showing the signals supplied to the field winding of the servo motor.

In order to facilitate an easier understanding of the present invention the subject matter thereof is herein divided into various sections in accordance with the outline set forth immediately below:

(I) General discussion (FIGS. 1, 2, and 3)
(II) Column sense circuits (FIGS. 4 and 5)
(III) Pack sense circuits (FIGS. 6, 7, and 8)
(IV) Tach sense circuits (FIGS. 9, 10, 11, 12 and 13)
(V) Firing amplitude reference circuit (FIGS. 14 and 15)
(VI) Circuit for determining amplitude of servo motor armature voltage (FIG. 16)
(VII) Circuit for determining polarity of servo motor armature voltage (FIGS. 17 and 18)
(VIII) Silicon controlled rectifier (SCR) circuit (FIGS. 19, 20, and 21)
(IX) Discussion of voltage applied to servo motor armature vs. the back EMF of said armature.

Figure 1:
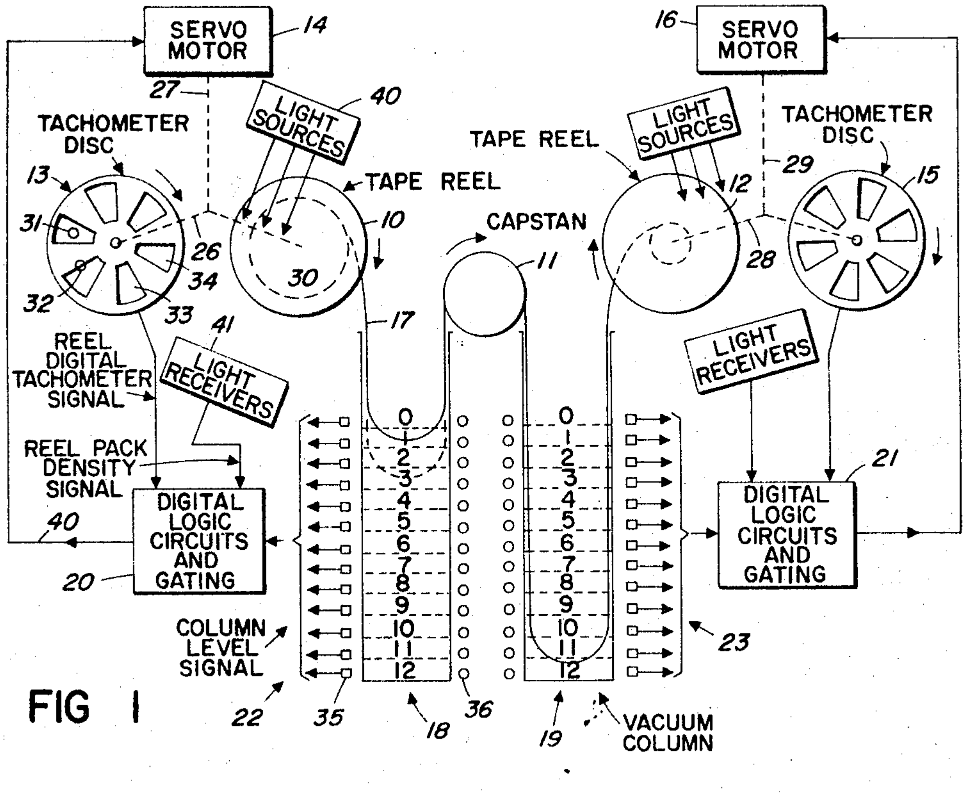
Figure 2:
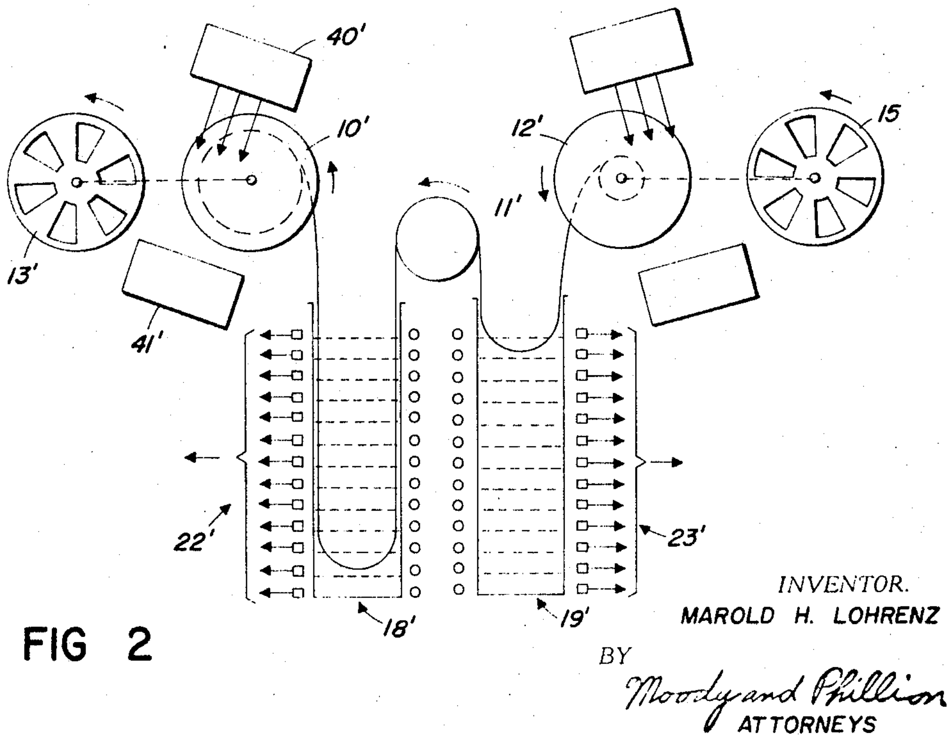
FIG. 2 is a diagram similar to that of FIG. 1 with the tape reels and the capstan rotating in a counterclockwise direction.
Figure 3:
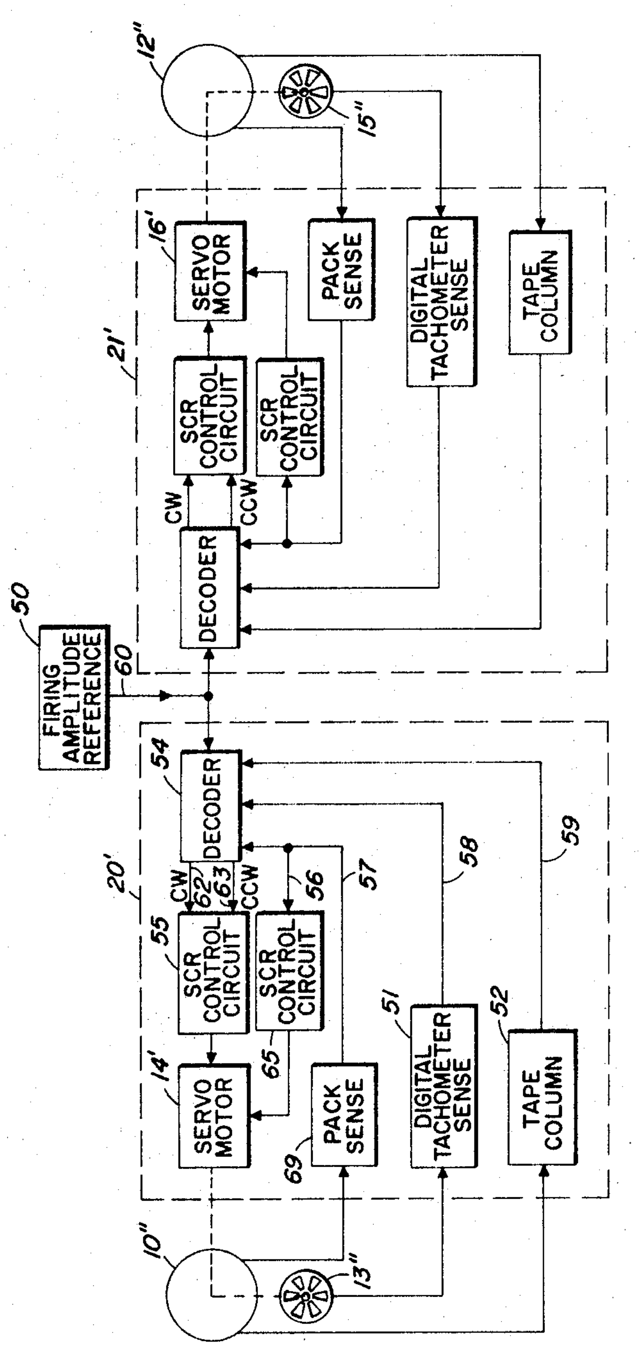
FIG. 3 is a block diagram of the overall system.

(I) General discussion (FIGS. 1, 2, and 3)

To facilitate an understanding of the specification definitions of clockwise and counterclockwise velocities and accelerations is desirable and are as follows. An increase of angular velocity of a tape reel either in a clockwise or a counterclockwise direction is defined as acceleration, assuming the reel to be rotating in said clockwise or counterclockwise direction, respectively, at that time. For example, if the tape reel is rotating in a counterclockwise direction, an increase of angular velocity in the counterclockwise direction is defined as acceleration. Similarly, if a tape reel is rotating in a clockwise direction, an increase in angular velocity in the clockwise direction is defined as acceleration. Decreases of angular velocity are defined as deceleration. Thus, if a tape reel is rotating in a counterclockwise direction and the absolute angular velocity is decreased towards zero velocity, such a change in velocity is defined as deceleration. Similarly, a reduction in clockwise angular velocity is termed deceleration. However, when the angular velocity of a reel is decelerated zero velocity and the direction of rotation reverses, the deceleration becomes acceleration.

It should also be noted that there are two tape reels associated with the tape transport; one on either side of the capstan and each capable of feeding into and extracting tape from an associated vacuum column. It will be noted from FIG. 1 that while the tape reel 10 of FIG. 1 must rotate in a clockwise direction to feed tape into its associated vacuum column, the other tape reel 12 must rotate in a counterclockwise direction to do so. In other words, the functions of the two tape reels is reversed insofar as directions of angular rotation are concerned. Consequently, in the detailed discussion of the structure, the discussion of the operation of a tape reel with respect to the tape level in the vacuum column, and the acceleration or deceleration of the driving servo motor will be made with respect to one tape reel only. Specifically, in the circuit of FIG. 1 the detailed discussion will be with respect to tape reel 10, vacuum column 18, servo motor 14 and logic circuits 20. It is to be understood that a similar explanation is applicable to tape reel 12, servo motor 16, column level 19, and logic circuits 21, all positioned on the right-hand side of the capstan 11 in FIG. 1. All angular velocities and accelerations would, of course, be reversed.

In FIG. 1 the tape 17 is driven either clockwise or counterclockwise by capstan 11. The means for driving capstan 11 is not shown in this specification since it does not form a part of the invention. It is assumed that the capstan driving means is conventional and controlled by some suitable controlling means. Well-known capstan driving means are capable of reversing the tape from a counterclockwise to a clockwise direction, or from a clockwise to a counterclockwise direction, or stopping the tape from either direction of rotation, or accelerating the tape to proper speed in either clockwise or counterclockwise direction from a stopped condition, in a few milliseconds.

Tape reels 10 and 12 are located on either side of capstan 11 to supply tape to, or to take tape from the capstan, depending on the direction of rotation of the capstan. The two vacuum columns 18 and 19 are provided on either side of capstan 11 to act as a buffer between tape reels 10 and 12 and capstan 11. Such a buffer is needed in order to accommodate the difference in times involved in acceleration of the capstan 11 and the heavier tape reels 10 and 12.

It will be noted that vacuum columns 18 and 19 are divided into levels from zero to 12. Each level has associated therewith an optical sensing system including a light source and a photoelectric sensing cell. For example, level 12 of vacuum column 18 has a light source 36 and a photoelectric sensing device 35 associated therewith. As the tape rises or falls in the columns, the upper group of these tape level sensing devices will be blocked by the tape 17. Thus, in column 18, tape 17 blocks the light from the photo sensing unit associated with level 0. However, the light between the light sources and the photoelectric cells of levels 1 through 12 is not blocked, so that the photo cells of each of these levels will produce a signal.

As will be seen later, the tape level in each of the thirteen levels of vacuum column 18 will call for a specific, preprogrammed voltage to be supplied to the armature of the servo motor 14 in accordance with the existing direction of rotation of servo motor 14. It should be noted at this time that such specific, preprogrammed voltage depends also on the pack density of the tape reel. In other words, as the pack density of the tape reel varies, the voltage supplied to the servo motor armature, at any given level in the vacuum column, will vary.

In the particular form of the invention described herein, four distinct pack densities of the tape reel are determinable. Such pack densities are determined by optical means including a plurality of light sources 40 and an equal number of light receivers 41. The light sources 40 emit three parallel focussed light beams 42 which pass across the surface of the tape on reel 10 in a plane parallel to the sides of the tape reel. When the amount of tape on reel 10 is sufficiently great so that all three light rays are thereby blocked from impinging on light receivers 41, the pack is said to be full. When the amount of the tape on the reel decreases so that only a single light beam is permitted to strike its associated light receiver, the pack level (also referred to as pack density), is three-quarters full. When two light beams impinge on their respective receivers, the pack density is one-half full. When all three light beams impinge on their receivers, the pack density is one-quarter full. In the particular condition of FIG. 1 only one light beam is impinging on its receiver 41 so the pack density is three-quarters full.

With a pack density of three-quarters and with the tape level being in level 1 in column 18, one of two accelerating voltages is supplied to the armature of servo motor 14, which is determined as follows. As indicated above, each level of the vacuum column calls for a certain angular velocity of the tape reel, and consequently, of the servo motor. If the servo motor is going below the desired speed then an accelerating voltage applied to accelerate the armature in a clockwise direction is applied to servo motor 14, which in turn accelerates the tape reel 10 in a clockwise direction. Conversely, if the servo motor 14 velocity is greater than called for by the particular condition shown in FIG. 1, then a different accelerating voltage is applied to servo motor 14, said different accelerating voltage applying a counterclockwise torque to servo motor 14, and thus decelerating the motor. It is to be noted that the applying of a counterclockwise torque to servo motor 14 does not necessarily reverse the direction thereof. It might only slow the servo motor towards zero velocity. However, as will be discussed in detail herein, if tape 17 continues to fall in vacuum column 18 and a counterclockwise torque is maintained on servo motor 14, eventually said servo motor will reverse and rotate in a counterclockwise direction.

In order to determine whether the servo motor is going too fast or too slowly for a given set of conditions, including pack density and tape level, both the angular velocity and the direction of rotation of the motor must be known. Both angular velocity and direction of rotation is determined by means of disc 13 and sensors 31 and 32 thereon.

Disc 13 has a series of apertures, such as apertures 33 and 34, cut therein. The angular width of these apertures is substantially equal to the width of the solid portions of the disc positioned therebetween, thus giving alternate and equal time intervals of aperture and disc as the disc rotates.

As can be seen from FIG. 1, disc 13 is driven directly by servo motor 14 through coupling means 26 and 27. The two sensors 31 and 32 are not spaced apart a distance equal to the distance between the center lines of two adjacent apertures but rather are spaced so that when one sensor 31 falls in the center of an aperture the other sensor 32 falls at the edge of the adjacent aperture. By suitable logic means the direction of rotation of the disc can be determined by this phase difference in the positioning of sensors 31 and 32. Further, the velocity of the disc, and thus of tape reel 10 and servo motor 14, can be determined by sensors 31 and 32.

Within block 20 are included the various logic circuits and programming necessary to process the data received from the tachometer disc 13, the pack sense device 30, and the column level indicators 22. From such data the digital logic circuits 20 will produce a signal which is supplied to servo motor 14 via lead 40, and having a polarity and amplitude to cause acceleration of the servo motor in the proper direction and with the proper torque in accordance with the programming within logic circuit 20.

In FIG. 1 it will be observed that tape reels 10 and 12 and capstan 11 are all turning in a clockwise direction. The tape level in vacuum column 18 is shown as being in level 1 and in vacuum column 19 is shown as being in level 12. Such conditions represent essentially a steady state condition, when the capstan is also rotating in a clockwise direction. If the capstan 11 should stop, or suddenly reverse to a counterclockwise direction, the tape would be extracted rapidly from vacuum column 19 and would be fed equally rapidly into vacuum column 18. The tape reels 10 and 12 would then respond quickly to slow down and reverse directions before vacuum column 19 became completely empty or vacuum column 18 became overfilled.

In FIG. 2 there is shown the steady state condition of the tape levels when tape reels 10′ and 12′ and capstan 11′ are all rotating in a counterclockwise direction. In the counterclockwise steady state the tape in vacuum column 18′ is at the lower end of said vacuum column, perhaps in level 11 or level 12. On the other hand, the tape in vacuum column 19′ is near the top of said vacuum column, perhaps in level 0 or level 1.

Referring now to FIG. 3 there is shown an overall block diagram of the invention. The blocks 20′ and 21′ correspond to the logic circuit blocks 20 and 21 of FIG. 1. Here again, since the block 20′ is exactly the same as the block 21′, except that it responds to, and controls, angular velocities and accelerations of opposite polarities, only the circuit within block 20′ will be described in detail.

Common to both of control circuits 20′ and 21′ is a firing amplitude reference 50. From the discussion of control circuit 20′ with respect to the firing amplitude reference 50, it will be apparent how firing amplitude reference 50 is used in connection with control circuit 21′.

In control circuit 20′, the circuits within blocks 69, 51, and 52 which function to digitalize, respectively, the pack sense signal, the angular velocity and direction of the servo motor sense signal, and the tape column sense signal. The output of circuits 69, 51, and 52 are supplied to decoder means 54 which is programmed by wired logic circuits to respond to the information supplied thereto to produce an output signal on either of its two output leads 62 or 63. An output signal supplied to output lead 62 is of an amplitude and polarity to provide a clockwise torque to servo motor 14. An output signal appearing on output lead 63 is of an ampitude and polarity to provide a counterclockwise torque to servo motor 14′.

Between decoder 54 and servo motor 14 is a servo motor control circuit 55 employing silicon controlled rectifiers (SCR's). The silicon controlled rectifiers are used in a bridge circuit, to be described later, and are fired by trigger pulses supplied from decoder 54 once during each half-cycle of the 60-cycle power source supplied to servo motor 14. The particular point in time that the silicon controlled rectifiers are fired during each half-cycle determines the amount of energy supplied to servo motor 14′. It should be noted that the silicon controlled rectifier controlled circuit 55 also functions to rectify the power from the power source (not specifically shown) so that the voltage actually supplied to servo motor 14′ is a D-C voltage, the magnitude of which is determined by the firing time of the SCR rectifiers.

If the power source utilized to power servo motor 14′ is a 60-cycle 110 volt source then the silicon controlled rectifiers must be fired at some point in each half-cycle of the 60-cycle source or once every 8⅔ milliseconds. To provide a point of reference from which firing time can be measured, there is supplied a firing amplitude reference source 50. Such firing amplitude reference source 50 detects the zero crossover points of the 60-cycle power supply and also divides each half-cycle into a number of equal increments. In the particular embodiment of the invention described herein such number of increments is sixteen. Thus the firing amplitude reference 50 functions to mark the zero crossover points of the supplied 60-cycle power source and further functions to provide 16 equally time-spaced markers for each half-cycle time interval of the 60-cycle power source. In utilizing the output of firing amplitude reference 50 the decoder 54 will select one of the sixteen markers for each half-cycle. More specifically, if very little acceleration of the servo motor is required, the decoder might use the 11th or 12th count of the firing amplitude reference. The SCR's would be fired at this time and would pass voltage from such 11th or 12th count until the next zero crossing, at which time the SCR's would be extinguished. Thus, only a relatively small portion of the 60-cycle power source would be converted to D-C voltage and supplied to servo motor 14'. On the other hand, if a large accelerating voltage were required, an early marking count of the firing amplitude reference would be chosen, such as a marking count 4 or 5. In such event a relatively large D-C decelerating voltage would be supplied to servo motor 14'.

The output of pack sense 69 is also employed to control the amount of D-C voltage supplied to the field of the servo motor 14'. The reason for this is as follows. The type load the servo motor is best adapted to handle varies with the strength of the field. With a high-inertia, low-speed type load a relatively large voltage is needed for the field of the motor. On the other hand, with a low-inertia, high-speed type load, such as a near empty tape reel, a relatively small voltage is needed for the field. Since the inertia and speed of the load is determined in part by the pack density the pack sense circuit 69 is employed to control the strength of the voltage supplied to the motor field.

Figure 4:
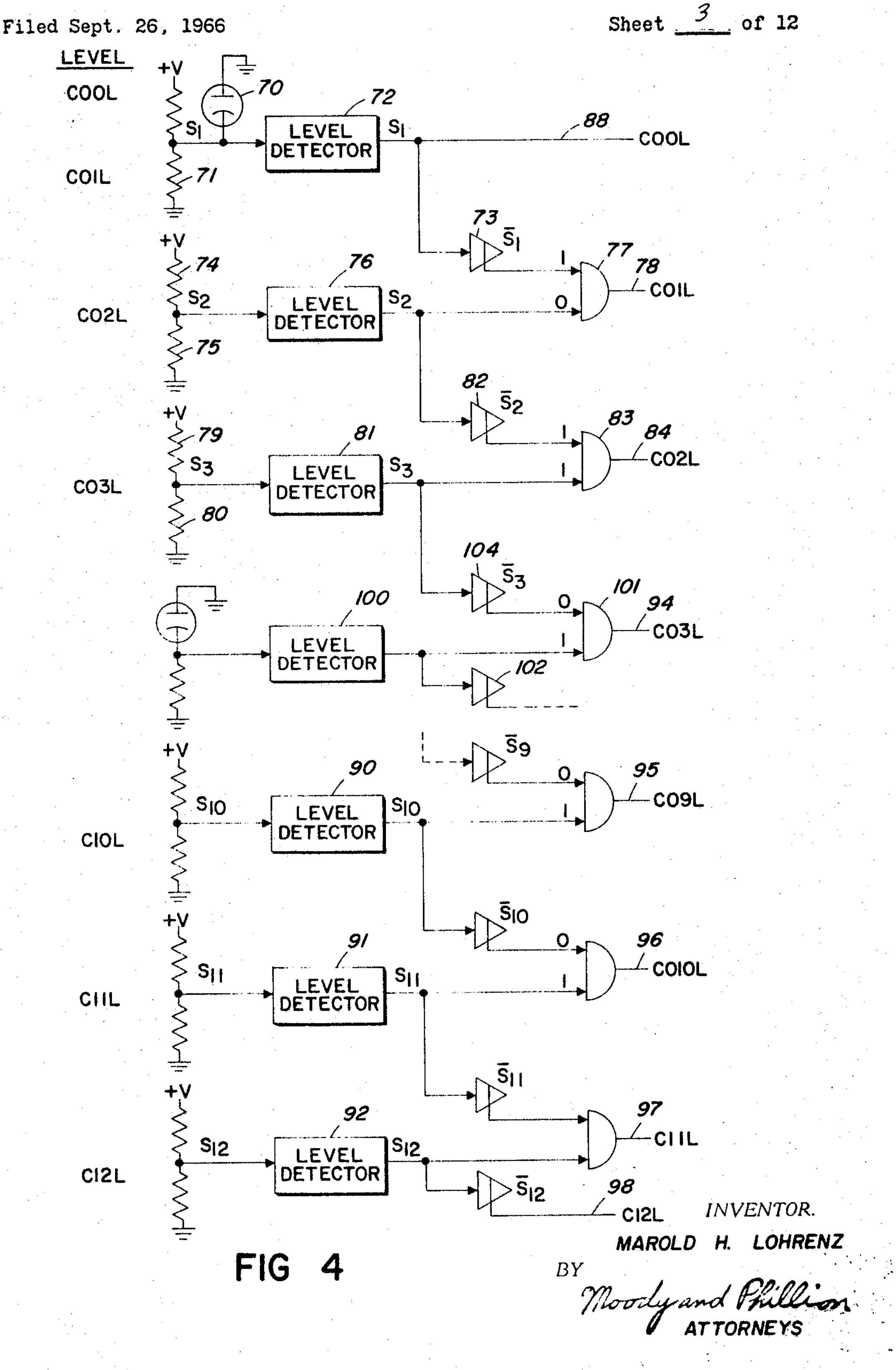
FIG. 4 is a logic diagram for obtaining the column sense signals.
Figures 5, 6:
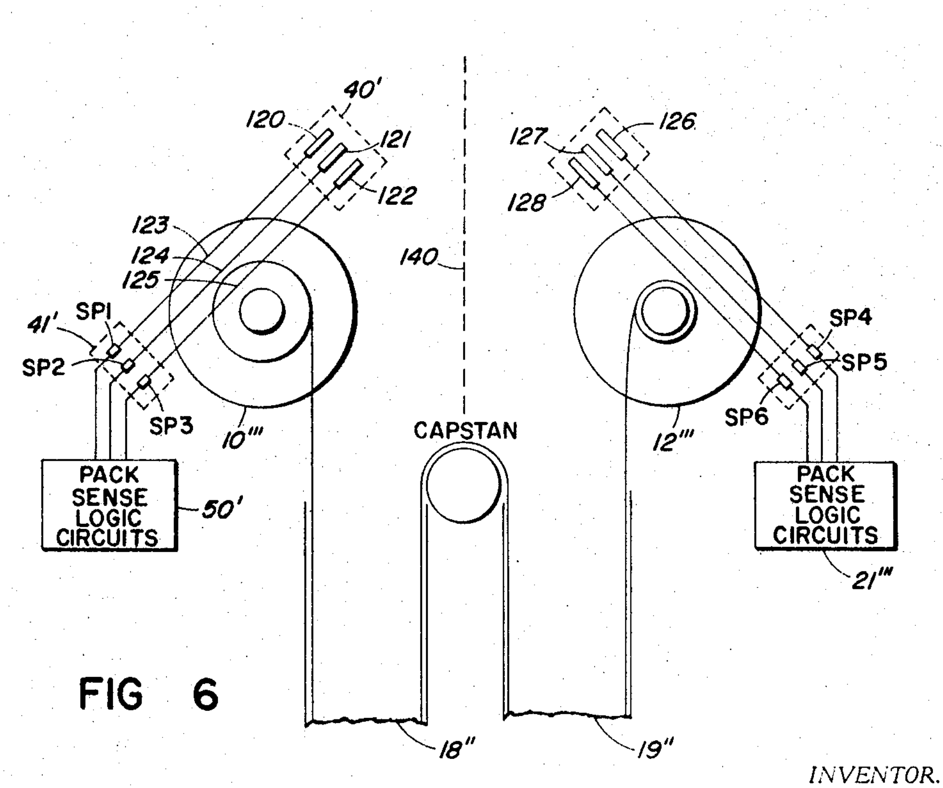
FIG. 5 is a truth table showing the relation between the various column levels and the sensed column level signals.
FIG. 6 shows the structure for obtaining the pack sense signals.

(II) Column sense circuits (FIGS. 4 and 5)

Referring now to FIG. 4, there is shown a combination schematic diagram and logic diagram of the circuit means required to detect and digitalize the level of the tape in the vacuum column. For each column level there is a corresponding photoelectric device, such as photoelectric cells 70, 74, and 79, for column levels 0, 1, and 2, respectively. In series with each of these photoelectric cells is a resistor, such as resistors 71, 75, and 80, which is connected to ground. When the light strikes the photocell, such as photocell 70, a voltage is generated thereacross which also appears across load resistor 71. A D-C voltage threshold detecting means 72 detects the voltage across resistor 71 and amplifies such voltage to a suitable level and then supplies it as a binary bit 1 to the output lead 88 which is designated as the column zero level output lead C00L. The output of level detector 72 is also supplied through inverter 73 to AND gate 77. The inverter 73 functions to change the 1 bit to a 0 bit, thus inhibiting AND gate 77.

It is to be understood that sensors 70, 74, and 79 will be energized by their associated light sources depending on the position of the tape in the column. For example, if sensor 70 is energized, this means the tape is at column level C00L, as indicated in the left-hand portion of FIG. 4. If the tape should drop into column level C00L, the light source associated with photoelectric cell 70 would be blocked so that cell 70 would not be energized and no voltage would appear across resistor 71. As the tape drops still farther in the column photoelectric cell 74 will become de-energized, and then photoelectric cell 79, and so on, as long as the tape continues to drop.

Assume, for purposes of discussion, that the tape level has dropped into column level C02L, so that photoelectric cells 70 and 74 are both de-energized, but the remaining photoelectric cells, including cell 79 and those down through level C12L of the vacuum column are still energized; i.e., are still receiving their associated light sources. In such circumstances the outputs of level detectors 72 and 76 will both be 0's and the outputs of the remaining level detectors, such as level detectors 81, 100 . . . 90, 91, and 92 will have outputs of binary 1's. Under such circumstances the output binary bits appearing on leads 88 and 78, representing column levels C00L and C01L will be 0's and the ouput signals appearing on the output terminals of the remaining column levels C02L through C12L, and including output leads 84, 94, 95, 96, and 97 will all be 1's. The reason for this will be apparent from the immediately following discussion. Since the output lead of level detector 72 is a 0, it is apparent that the signal appearing on output terminal 88 is a zero. Further, the output of inverter 73 is a 1 which is supplied to one of the inputs of AND gate 77. The output of level detector 76 is a 0 which is supplied to the other input lead of AND gate 77. Consequently, AND gate 77 is inhibited and has a 0 output which appears on the output lead 78, representing the first level of the vacuum column. The zero output of level detector 76 is inverted by inverter 82 and supplied as a 1 to one input of AND gate 83. However, in this case the other input of AND gate 83 also has a 1 supplied thereto from level detector 81, since the photoelectric cell 79 is energized. Thus the output of AND gate 83 is a binary 1 appearing on output lead 84 thereof and representative of the second level of the vacuum column C02L. The remaining column level output terminals, from level output C03L to level C12L to level C12L, all have 0's thereon since their associated AND gates, such as AND gate 101 of level C03L, has a 0 output. Such AND gates all have 0 outputs since the photoelectric cells from level C03L on down to level C12L are all energized, and the outputs of the associated level detectors from level detector 81 on down through level 12 are 1's. The inverters associated with each of these levels, such as inverter 104, function to invert the 1 to a 0 and thus inhibit the AND gate of that level.

It can thus be seen then that the only AND gate which has a 1 output is the AND gate associated with that level to which the tape has dropped. A truth table showing the operation of the circuit of FIG. 4 is shown in FIG. 5. An examination of this truth table in conjunction with the foregoing discussion of FIG. 4 will show that AND gates, such as AND gates 77, 83, and 101 of FIG. 4, detect the 1 to 0 transition of adjacent levels. In FIG. 5 it can be seen that the 1 to 0 transitions follow a diagonal line from the upper left-hand corner of the truth table down to the lower right-hand corner.

(III) Pack sense circuit (FIGS. 6, 7, and 8)

In FIG. 6 there is shown a more detailed diagram of the optical means employed in obtaining the pack density sensing signals. More specifically, three light sources 120, 121, and 122 are associated with reel 10''', and three light sources 126, 127, and 128 are associated with reel 12'''. Three sensors, which can be photoelectric cells are also associated with each tape reel. Sensors SP1, SP2 and SP3 are associated with reel 10''' and sensors SP4, SP5, and SP6 are associated with reel 12'''.

Since the structure to the left of dotted center line 140 operates in the same manner as that to the right of center line 140, only the structure to the left of the line 140 will be described. Light sources 120, 121, and 122 and sensors SP1, SP2, and SP3 all lie in a common plane perpendicular to the axis of rotation of reel 10''' and positioned in-between the two sides of reel 10'''.

Each of the light sources 120, 121, and 122 emits a focused beam of light 123, 124, and 125, respectively, which unless blocked by the tape, passes between the sides of reel 10''' and impinges upon sensors SP1, SP2, and SP3, respectively. The sensors SP1, SP2, and SP3 respond to the light beam impinging thereon to supply an electrical signal to the pack density logic circuit 50'.

Light sources 120, 121, and 122 and associated sensors SP1, SP2, and SP3 are positioned so that light beams 123, 124, and 125 will indicate the amount of tape on the reel in discrete quantities defined as one-quarter full, one-half full, three-quarters full, and full. More specifically, if the amount of tape on the reel is sufficiently large so that all three beams of light are blocked by said tape from reaching sensors SP1, SP2, and SP3, then the tape density of the tape reel is defined as being full.

If the amount of tape on reel 10''' blocks beams 124 and 125 but permits beam 123 to pass, then the pack density of the reel is three-quarters full. If only light beam 125 is blocked, the pack density reel is one-half full, and if all three light beams are permitted to pass to their associated sensors, then the pack density is one-quarter full.

Sensors SP1, SP2, and SP3 can be photoelectric cells, the output signals of which are supplied to pack sense logic circuit 50', which circuit interprets the received signals to produce an output signal on one of four output leads (shown in FIG. 7) indicating pack density. Reference is made to FIG. 7 which shows the logic diagram of the pack sense logic circuit 50' of FIG. 6, and also to FIG. 8 which shows in truth table form the operation of the structure of FIG. 7.

In FIG. 7 each of the sensors SP1, SP2, and SP3 is connected in series with a load resistor 150, 151, and 152, respectively. The tap between the sensor and the associated load resistor is connected to one of the level detectors 153, 154, and 155. The output of each of the level detectors goes to an AND gate and also to an inverter circuit, and operates generally in the same manner as the circuit of FIG. 4, with some exceptions, as will be discussed below.

For purposes described in the operation of FIG. 7, assume that sensors SP1 and SP2 are energized and that sensor SP3 is not energized, indicating that the tape reel is one-quarter to one-half full. The outputs of level detectors 153 and 154 will both be binary 1's since the sensors SP1 and SP2 are both energized. The output of level detector 155 will be a 0 since sensor SP3 is not energized due to the light beam directed thereto being blocked by the tape on the reel.

Consider now the outputs appearing on the output leads 161 through 164. Since the output of level detector 153 is a 1, the output of inverter 156 and thus the output on lead 161 will be 0's. Since the output of inverter 157 is a 0, and the output of level detector 153 is a 1 the output of AND gate 162 is a 0. The output of inverter 158, however, is a 1, and since the output of level detector 154 is also a 1, the output of AND gate 160 is a 1. The output appearing on lead 164 is a 0. Thus the only output lead having a 1 thereon is output lead 163, which represents a pack density of one-half or one-quarter to one-half full. Such conclusion is verified by the truth table of FIG. 8.

As another example, if the pack density of the reel had been one-half to three-quarters full then a 1 would have appeared on output lead 162 and 0's on leads 161, 163, and 164.

(IV) Tachometer sensing circuits (FIGS. 9, 10, 11, 12, and 13)

In FIG. 9 the tachometer wheel 13''' is mounted on shaft 182 which is the same shaft that the tape reel 10 of FIG. 1 is mounted on, and is driven by the same servo motor 14. In the wheel 13''' there is formed a plurality of apertures, such as apertures 176 and 177. Between each aperture is a solid portion of the wheel, such as portion 190. The width of the portion 190 is the same as the width of aperture 177 or 176, at the same radial distance from the center of shaft 182. On one side of the shaft are positioned a pair of light sources 178 and 179 which direct beams of light respectively at sensors STA and STB located on the other side of the wheel. The said sensors STA and STB can be photoelectric cells, for example, with output leads 183 and 184 connected to tachometer sensing circuit 51'.

Although only one light source and corresponding sensor is required to compute the speed of the rotating disk, two sensors, positioned apart a certain angular distance, are required in order to determine the direction of rotation. The points 180 and 181 in FIG. 9 represent the points at which the light from the sources 178 and 179 intercept the plane of a disk. It will be seen that the points 180 and 181 are spaced apart a distance less than the distance between the center lines of two adjacent apertures. More specifically, the points 180 and 181 are spaced apart approximately three-quarters of the distance between the center lines of two adjacent apertures so that they have a phase displacement with respect to each other of approximately 90 degrees.

Figure 10:
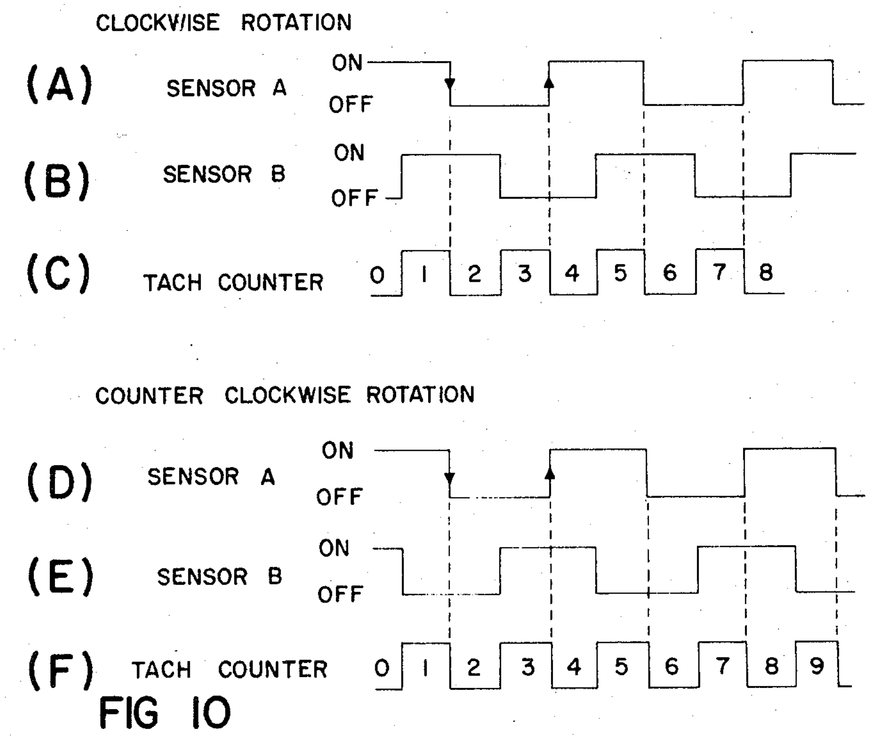
FIG. 10 is a set of waveforms representing the signals obtained from the structure of FIG. 9.

In FIG. 10 the waveforms A, B, and C show the outputs of sensors STA and STB and the output of the tach counter when the wheel is rotating in a clockwise direction. In the waveforms D, E, and F of FIG. 10 are shown the curves of the outputs of sensors STA and STB and the tachometer output when the disk 13''' is rotating in a counterclockwise rotation. Since the sensors are physically positioned 90 degrees apart with respect to the apertures, the output voltages generated thereby will be phased apart by 90 degrees as shown in FIG. 10. Further, since the tachometer output registers a count each time the output voltage of sensor STA or sensor STB either rises or falls, the total count will be the same regardless of the direction of rotation of the disk 15'''. Thus the count shown in curve 10C is the same as the count shown in 10F.

It will be noted that the output of sensor STA shown in FIG. 10A leads the output of sensor STB shown in FIG. 10B by 90 degrees when the rotation is clockwise, but lags the output of sensor STB by 90 degrees when the rotation is counterclockwise, as can be seen from the waveforms of FIGS. 10D and 10E.

Figure 11:
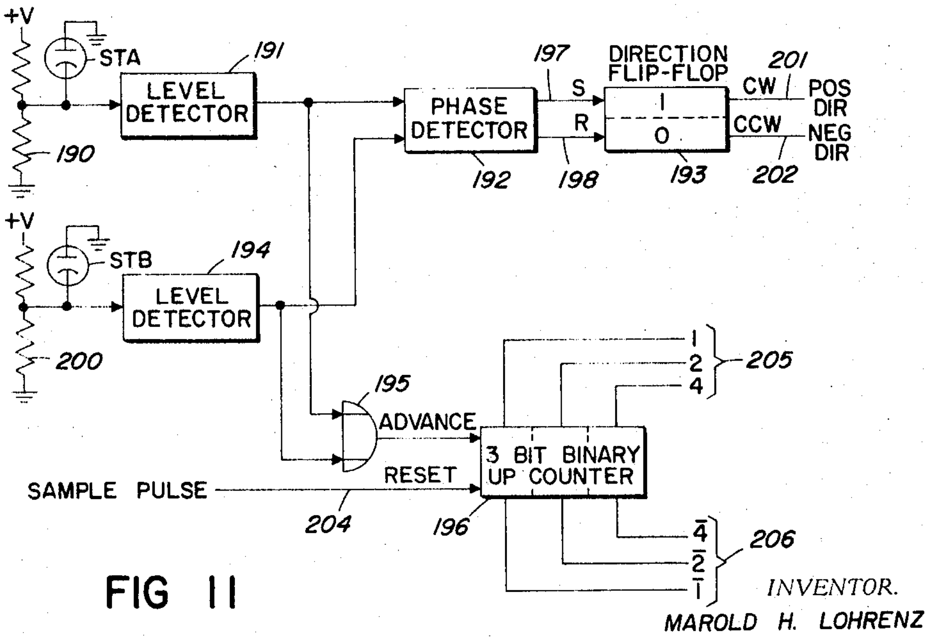
FIG. 11 shows the logic diagram for establishing digitalized signals representative of various velocities and direction of velocities of a tape reel.

In FIG. 11 there is shown the detailed logic diagram of the circuit means contained in the tachometer sensing circuit 51' of FIG. 9. In FIG. 11 the sensors STA and STB are connected, respectively, through resistors 190 and 200 to ground potential. The tape between sensors STA and STB and their associated resistors are connected to the input of level detectors 191 and 194, respectively, which function to amplify the voltage appearing across either resistors 190 or resistor 200 up to the proper logic level. It is to be noted that when sensor STA is energized, i.e., when a light source is impinging thereon, the voltage across the associated load resistor will be positive. In the absence of an impinging light, the voltage across the load resistor will be zero, or ground potential.

The outputs of level detectors 191 and 194 are the square wave outputs shown in FIGS. 10A and 10B, or 10D and 10E, depending upon the direction of rotation of disk 13'''. A phase detector 192 responds to the outputs of level detectors 191 and 194 to produce a signal on either of output leads 197 or 198 to set or reset the direction-indicating flip-flop 193 in accordance with the direction of rotation of disk 13'''. If the disk is rotating in a clockwise direction the flip-flop 193 is set to produce a 1, or positive output on its output lead 201. If the direction of rotation of the disk 13''' is counterclockwise, the flip-flop 193 is reset and a 1 appears on its output lead 202 designating a negative or counterclockwise direction of rotation.

The outputs of the level detectors 191 and 194 are supplied also through OR gate 195 to a three-bit binary counter 196. Also supplied to the binary counter is a sample pulse on lead 204. Such sample pulse 204 is derived from the crossover detector circuit 232 of FIG. 14 (yet to be discussed), and functions to reset the binary counter 196 at each zero crossover point of the firing amplitude reference of circuit 50 of FIG. 3.

The three-bit binary counter 196 thus begins a count anew after each zero crossover point of the reference signal, which is a 60-cycle signal, and will count up to a maximum of seven, depending on the speed of rotation of the disk 13''' of FIG. 9. The number of apertures in the disk have been selected so that the count will never exceed seven in the operational range of the structure. Both the true and the false outputs of the binary counter 196 are shown in FIG. 11. More specifically, the true outputs, of which there are three, are designated by the reference character 205, and the false outputs, of which there are three, are designated by the reference character 206. The outputs of the three-bit binary counter 196 indicate the actual speed of the tachometer disc by increments. For example, a count of six registered in the three-bit binary counter 196 during a counting period would indicate that the tachometer disc was rotating at an angular velocity between 66 and 77 radians per second. The direction of rotation as stated above is indicated by the output of flip-flop 193.

Figures 12, 14:
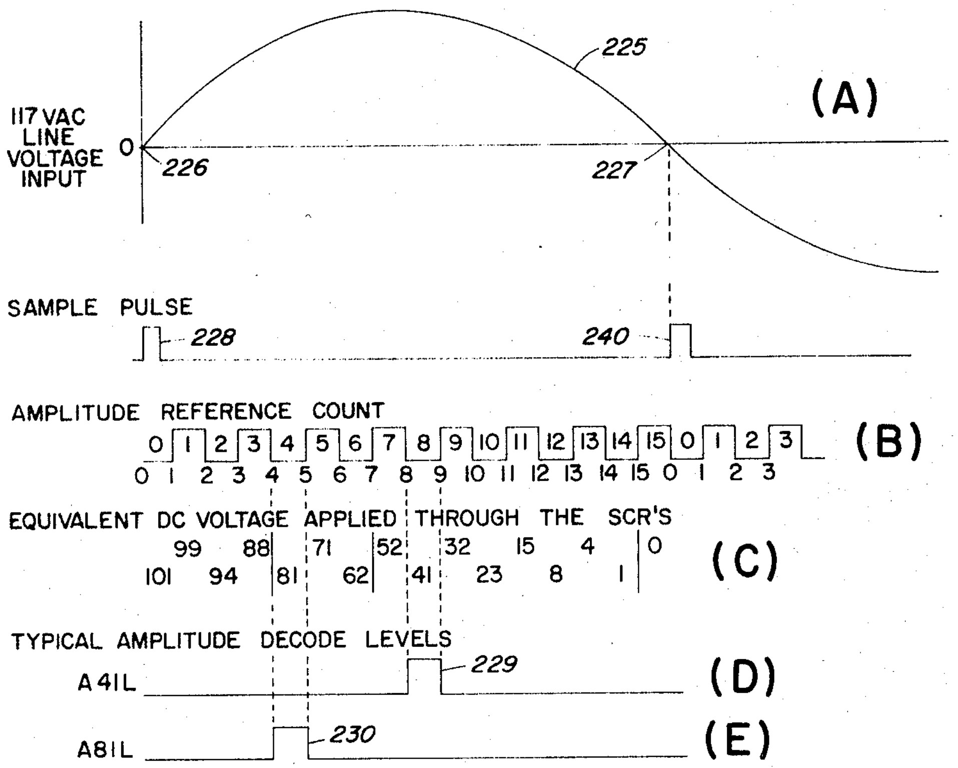
FIG. 12 is a truth table for the operation of the logic diagram of FIG. 11.
FIG. 14 is a detailed block diagram of the firing amplitude reference circuit.

FIG. 12 shows a truth table relating the outputs of the directional flip-flop 193 and the three-bit binary counter 196 to the actual speed range of the tachometer disc. It will be observed in FIG. 12 that there are sixteen levels of speed, eight for each direction. These levels are designated from zero to seven. For example, in the clockwise direction the levels are designated from P0L to P7L, the P designating a positive, or clockwise, direction. Similarly, the counterclockwise velocity levels are designated from N0L to N7L with the N indicating a negative or counterclockwise, direction. The output of the direction indicating flip-flop 193 of FIG. 11 forms the most significant digit of a four-bit binary character with the other three bits comprising the three outputs of the binary counter 196 of FIG. 11. In the column at the extreme right of FIG. 12 is shown the actual angular velocity in radians of the tachometer disc for any given output of the tachometer binary counter 196 of FIG. 11. The range of velocities run from 88 radians per second in a clockwise direction to 88 radians per second in the counterclockwise direction.

As will be recalled from previous discussion of column level sensing circuits and pack density sensing circuits, for any given set of conditions, including a given column level for the tape and a given pack density for the reel, a certain angular velocity of the tape reel (or tachometer disc) is desired and a certain actual angular velocity of the tachometer disc will actually exist.

As will be discussed in detail later in connection with FIGS. 16, 17, and 18, if the actual velocity of the tachometer is equal to, or greater, than the desired velocity, the servo motor will be braked. On the other hand, if the actual velocity of the tachometer is less than the desired velocity, the servo motor will be accelerated.

It is to be noted that while the phrase "desired velocity" has been employed in the preceding few paragraphs, that what is really meant is a range of velocities with the limiting velocity being the threshold velocity. Thus when an actual velocity is said to be greater than a desired velocity, it is meant that the actual velocity is greater than the threshold velocity of a range of velocities. For further clarification, consider the following examples.

Assume first that for a given condition of column level and pack density that the desired threshold velocity is P4L, with the motor rotating in a clockwise direction. If the actual velocity is P5L, which is faster than P4L, the servo motor will be decelerated, i.e., a counterclockwise torque will be applied to the armature of the motor. On the other hand, if the actual velocity of P3L, which is slower than the threshold velocity P4L, a clockwise torque will be applied to the servo motor armature to increase the velocity of the motor in the clockwise direction.

In order to accomplish this function, the condition of column level and pack density, which calls for a threshold velocity of P4L, must employ a gating network which is responsive to all actual velocities equal to, or greater than P4L, and specifically including velocities P5L, P6L, and P7L, and must be nonresponsive to actual velocities that are lower as, for example, P3L, P2L, P1L, and P0L.

Consider now the case where the reel is rotating in a counterclockwise direction. Assume the conditions of tape level and pack density are such as to require a threshold velocity of N4L as shown in FIG. 12. If the actual velocity of the tape reel is either N5L, N6L, or N7L then a torque will be supplied to the armature of the servo motor to decelerate (brake) said servo motor. On the other hand, if the actual velocity of the tape is less than N4L, such as N3L down through N0L, then the speed of the servo motor in the counterclockwise direction is too slow and additional counterclockwise torque will be supplied to the armature thereof to accelerate the motor.

Thus for each pack output level P0L through P7L and N0L through N7L a separate and unique logic circuit must be supplied whereby all actual speeds greater than the desired threshold velocity will be included and will produce an output at such given tachometer output level.

Reference is made to FIGS. 13A through 13P wherein individual logic circuits are shown for each of the sixteen tachometer output levels of the table of FIG. 12. A few of these logic circuits will now be discussed in some detail to illustrate how they are formed. They are relatively simple, however, and it is felt that the reader can readily understand the operation of the remaining ones simply by referring to the truth table of FIG. 12. In FIG. 13A the "4," and "2," and "1" outputs of binary counter 196 of FIG. 11 and supplied to AND gate 210. When a binary 1 is present on all three of such outputs the AND gate 210 will supply a "1" output to the input of AND gate 211. When the tach wheel (and the tape reel) is rotating in a clockwise direction there will be a 1 on the output lead 201 of direction flip-flop 193 of FIG. 11 which will be supplied to the other input of AND gate 211. The AND gate 211 will then have an output of 1, indicating a tach output level of P7L. Since P7L is the highest clockwise speed, the logic circuit need not include any speeds other than P7L. It is to be noted that two AND gates are needed in the circuit of FIG. 13A.

Reference is now made to the circuit of FIG. 13C wherein it is desired to detect a tach output level of P5L, or greater. The output level P5L must also include the higher output levels P6L and P7L and exclude all levels below P5L, such as P4L, P3L, etc. AND gate 212 is responsive to a 1 level on the "4" output lead of binary counter 196 of FIG. 11, a 0 level on the "2" output lead, and a 1 on the "1" output lead to produce a 1 at the output of gate 212. Thus the level P5L is supplied to OR gate 214. Levels P6L and P7L are included in the logic circuit by means of AND gate 213 to which the "4" and the "2" output leads of the tach binary counter 196 are supplied. When both the "4" and the "2" levels of the tach output counter are a binary 1, then the output of AND gate 213 is also a 1. Reference is made to the chart of FIG. 12 which shows that for tachometer output levels P7L and P6L the "4" level and the "2" level output of the tach counter 196 are both a binary 1. The OR gate 214 of FIG. 13C responds either to the output of AND gate 212 or AND gate 213 to provide a 1 to AND gate 215. When the direction of the tachometer wheel is positive, a 1 will be supplied on lead 201′ so that AND gate 215 will produce a 1 output, indicating an actual velocity of the tach wheel of P5L, or greater. It is to be noted that the circuit of FIG. 13C includes three AND gates and one OR gate.

Reference is now made to FIG. 13L where it is desired to detect a tach velocity of N3L, or greater. It is necessary to include in the logic circuit of FIG. 13L all velocities equal to N3L or higher; specifically including velocities N4L, N5L, N6L, and N7L. The velocity N3L is obtained by means of AND gate 217 to which the "2" level output and the "1" level output of the tachometer binary counter 196 are supplied. The output levels N4L, N5L, N6L, and N7L are obtained directly from the "4" level output of tach counter 196. The OR gate 218 responds either to the "4" level tach counter output or to the output of AND gate 217 to supply a 1 to AND gate 219. When the direction of a tachometer wheel is negative, i.e., counterclockwise, a 1 will appear on lead 202′ and the AND gate 219 will have an output of 1, indicating an actual velocity of the tachometer wheel of N3L, or greater.

Figure 13:
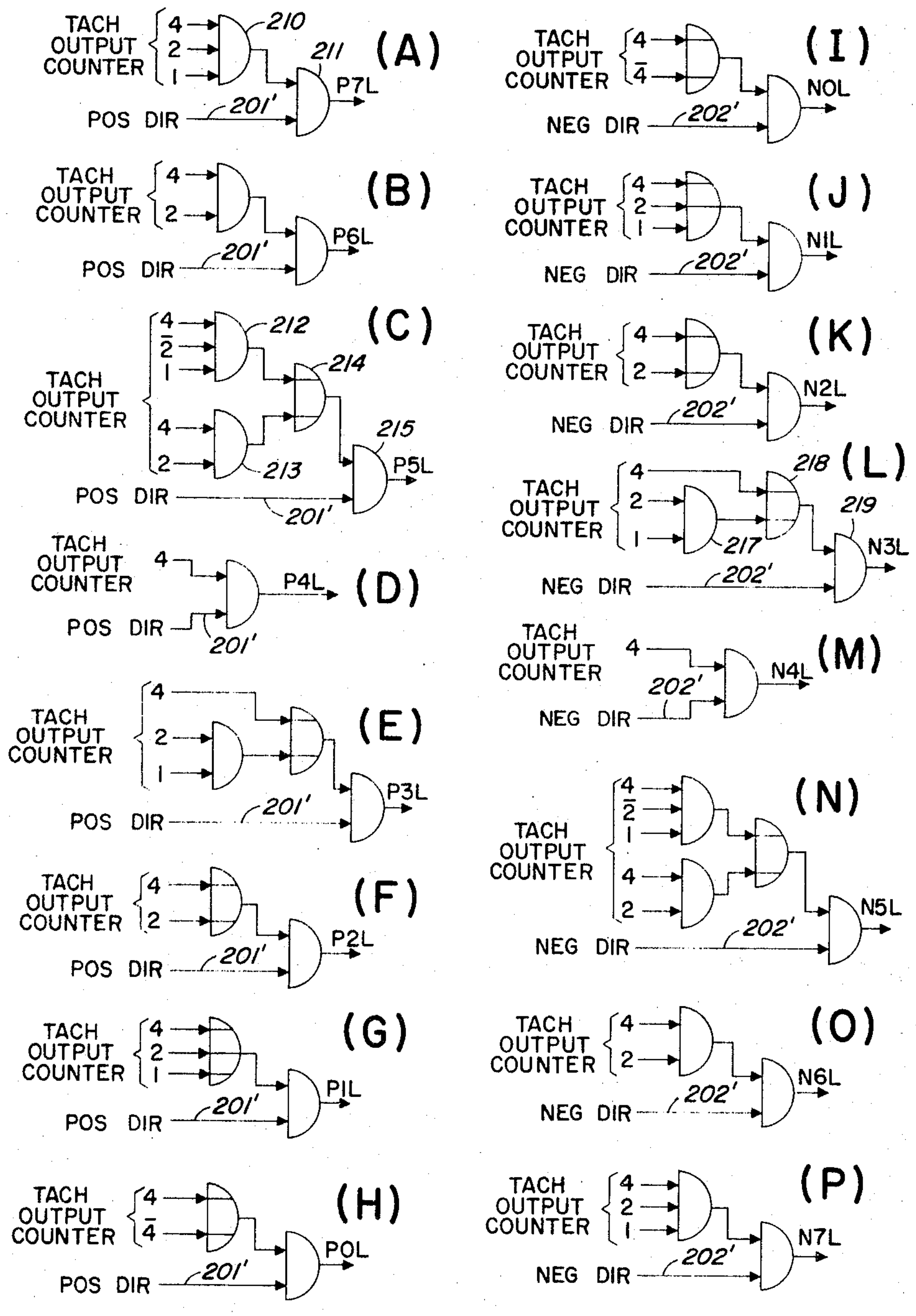
FIG. 13 is another logic diagram for determining a threshold velocity which is employed in determining whether the motor should be driven in a counterclockwise or a clockwise direction.

In a similar manner the other logic circuits of FIG. 13 can be easily interpreted with the aid of truth table of FIG. 12.

Figure 15:
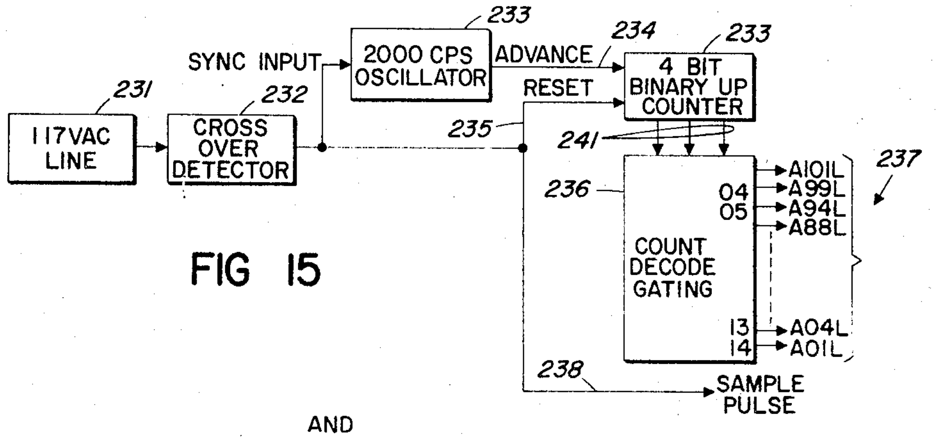
FIG. 15 shows voltage waveforms of the firing amplitude reference circuit.

(V) Firing amplitude reference (FIGS. 14 and 15)

As has been discussed hereinbefore, the voltage actually supplied to the armature of the servo motors is directly under the control of a control circuit utilizing silicon-controlled rectifiers, and the amplitude of the voltage supplied to the servo motors is determined by the point in each half-cycle of the applied 110-volt, 60-cycle power source, that the SCR's are fired. Firing of the SCR's specifically is caused by a trigger pulse which occurs at some predetermined time during each half-cycle of the 60-cycle power source.

Such trigger pulses are generated in the firing amplitude reference circuit shown as block 50 of FIG. 3, and shown in more detailed form in FIG. 14.

The firing amplitude reference circuit generates a series of trigger pulses, each series beginning at a zero crossover point of the 60-cycle power source signal (which is also the reference signal), and occurring at regular intervals during the half-cycle. Specifically, each half-cycle of the 60-cycle power source is divided into sixteen intervals with a trigger pulse occurring at the end of each interval.

In FIG. 15 the 60-cycle power source, represented as block 231, supplies a 60-cycle 117-volt output to cross-over detector network 232 which functions to detect the crossover points and reset a binary counter 233 via input lead 235. The output of the crossover detector 232 is also supplied to output lead 238 and functions as a sample pulse in a manner to be described later. A typical half-cycle of the 60-cycle input signal is shown in FIG. 14A. The pulses 228 and 240 are sample pulses generated by crossover detector 232.

A 2000 c.p.s. oscillator 233 runs continuously and functions to supply pulses to the four-bit binary counter 233 at the 2000 c.p.s. rate, which is the proper frequency to cause the four-bit binary counter to count from 0 to 15 during a half-cycle of the 60-cycle input signal, as shown in FIG. 14B. Resetting of binary counter 233 occurs at the next zero crossover point 240 of the 60-cycle input signal.

The four output terminals of binary counter 233 are supplied to a count decode gating circuit 236 which functions to produce, successively, a train of output pulses on successive ones of its plurality of output terminals. For example, the count of zero will produce an output on output lead A101L of decoding circuit 236. The next pulse, representing the count of one, will produce an output pulse on output lead A99L. Reference is made to FIG. 14C which shows the equivalent D-C voltages generated in the SCR control circuit 55 of FIG. 3 when said SCR's are triggered at the times corresponding to the various counts of four-stage binary counter 233. It will be observed that the identifying labels of the output terminals of the count decoder 236 include as part of the identifying labels, the D-C voltage which will be developed when the trigger pulse corresponding to that particular count is employed to fire the SCR's in the servo motor control circuits, as will be shown in detail later.

Thus the circuit of FIG. 15 produces a plurality of 16 pulses occurring approximately one-half millisecond apart during each half-cycle of the applied 60-cycle input signal.

The fixed wired programming circuits of FIGS. 16 through 21, yet to be described in detail, function to interpret the signals received from the pack sense circuit, the digital tach sense circuit, and the tape column sense circuit, to select one of the output pulses of count decode gating circuit 236 to fire the SCR's of the control circuits for the servo motor at the proper time and in the proper polarity to accelerate or decelerate said servo motor.

(VI) Fixed wire programmed circuit for determining the amplitude of a servo motor armature voltage (FIG. 16)

In FIG. 16 there is shown a plurality of AND gates 250 through 255. Each AND gate has two inputs thereto, one of which inputs is connected to a particular output terminal (C00L–C12L) of the column sensor circuit shown in FIG. 4. The other input is connected to a particular output of the count decode gating circuit 236 of FIG. 15. Thus if the tape is in a particular level of the vacuum column a particular output pulse from the firing amplitude reference circuit 50 of FIG. 3 will automatically be selected to control the firing of the SCR's in the servo motor control circuit 55. For example, if the tape is in the second level of the vacuum column, the AND gate 253 of FIG. 16 will be activated when a pulse from lead A62L of the amplitude reference circuit 236 of FIG. 14 occurs. The numeral 62 in the reference character A62L indicates that a D-C voltage of 62 volts will be generated in the SCR control circuit 55 of FIG. 1.

The trigger pulse appearing on lead A62L will pass through AND gate 253 and OR gate 256 to the output lead 262 which is also labeled ACW which means "Amplitude Clockwise." In other words, the trigger pulse A62L will only be utilized if it is desired to provide a clockwise torque to the armature at this time. Depending on the direction of rotation of the tachometer and the actual velocity of the tape reel it might be necessary to apply a counterclockwise torque to the servo armature when the tape is in the second level of the vacuum column. To accommodate such a possibility a second amplitude decode circuit is shown in the lower half of FIG. 16. This second amplitude decode circuit also comprises a plurality of AND gates 257 to 261, the outputs of which feed into a common OR gate 264.

Assume again that the tape is in the second level of the vacuum column. The other terminal of AND gate 259 is connected to the output A15L of the count decode gating circuit 236 of FIG. 14. Consequently, a timing pulse from output terminal A15L of count decode gating circuit 236 will pass through AND gate 259 and OR gate 264 to output terminal lead 263. Such timing pulse will fire the SCR's to provide a D-C voltage of fifteen volts to the armature of the servo motor. The symbol ACCW associated with output lead 263 means "Amplitude Counterclockwise."

Thus for each condition of the tape, a trigger pulse will appear on output lead 262 of FIG. 16 and also on the output lead 263 of FIG. 16. Means are required to determine which of these two timing pulses will be employed to fire the SCR control circuit. More specifically, the selection of which of these two timing pulses will be employed is determined by whether the torque supplied to the armature should be clockwise or counterclockwise. Such a determination is made in the circuit of 17 which will next be discussed.

(VII) Fixed wire programming circuit for determining polarity of servo motor armature voltage (FIGS. 17 and 18)

FIG. 17 shows the logic diagram for determining whether the torque applied to the servo motor armature should be clockwise or counterclockwise. It is to be noted that the diagram of FIG. 17 is not complete. Actually, each column level has a preprogrammed logic circuit. However, in FIG. 17 only the fixed wire programs for the first, the second, and the eleventh level of the vacuum column is shown. The complete circuit is represented in FIG. 18 in the form of a chart which will be readily understood by one skilled in the art.

In FIG. 17 there is provided a plurality of groups of four AND gates having reference numbers of 300 through 311. Specifically, there is shown three groups of four AND gates, one group for level 1, one for level 2, and one for level 11, of the vacuum column. Each of the four gates in each group has its output supplied to an OR gate, such as OR gates 312, 313, and 314. The outputs of the OR gates are supplied to another AND gate, such as AND gates 315, 316, and 317. Also supplied to these last mentioned AND gates is the sensing signal from the vacuum column level. The outputs of all the AND gates 315, 316, and 317 are supplied to a common OR gate 318. If the output of OR gate 318 is a 1, such 1 will appear on output lead 319 and will be employed to cause the torque supplied to the servo motor armature to be clockwise. The terminology DCW means "Direction Clockwise." On the other hand, if the output of OR gate 318 is a 0, said 0 will be inverted by inverter 320 and will appear as a 1 on output lead 321 and will be employed to determine that the voltage supplied to the servo motor armature will produce a counterclockwise torque. The terminology DCCW means "Direction Counterclockwise."

As an illustrative example of the foregoing, assume that the tape is in the second level and that the pack is three-quarters full. An input signal will then appear on the column level lead C02L which is supplied to one input terminal of AND gate 316. Also, a 1 will appear on the input lead marked "three-quarters full" of AND gate 306. Now if the actual velocity of the tape reel is positive, i.e., clockwise, and is equal to or greater than the threshold velocity P3L, then a 1 will appear on the input lead P3L of AND gate 306, thus producing a 1 at the output of said AND gate 306. Such 1 will pass through OR gate 313 and to the upper input lead of AND gate 316. AND gate 316 thus will be conductive to supply a 1 to inverter 326. The output of inverter 326 will be a 0 which will produce a 0 output on the output lead 319 of OR gate 318. Such 0 will be inverted by inverter 320 to produce a 1 on the output lead 321, thus indicating that a counterclockwise torque should be supplied to the armature of the servo motor.

The above logic can be summarized by stating that in the particular conditions given the servo motor was traveling in a clockwise direction with a velocity greater than that desired. Consequently, the programming dictated that a counterclockwise torque should be applied to the servo motor to decelerate said motor.

Assume the alternate case now where the actual speed of the tape reel was less than the threshold value P3L. Under such circumstances the AND gate 306 will not be conductive since a 1 will not appear on the input lead marked P3L of said AND gate. Consequently, a zero will appear on the output of OR gate 313 and on the output of AND gate 316. The inverter 326 will invert said 0 to a 1 which will appear on the output lead 319 of OR gate 318, and thereby instruct a control circuit, to be described later, that the torque supplied to the servo motor armature should be clockwise.

It should be understood that the inputs to AND gates 300 to 311 are steady state values, i.e., they are not pulses. Thus the output from OR gate 318 is a steady state value which can change from 0 to 1 depending on the actual conditions existing in the device. A sampling pulse will sample the output of the OR gate 318 at every zero crossover of the 60-cycle input signal.

In the examples discussed above it has been assumed that the tape reel was rotating in a clockwise direction. In the event that the reel is traveling in a counterclockwise direction, the tape will be in one of the lower levels of vacuum column 18 (FIG. 1). Assume specifically that the tape is in level 11 and that the pack density is three-quarters full. Now, if the actual velocity of the reel is equal to, or greater than a threshold value N4L, then AND gate 310 of FIG. 17 will be energized to produce a 1 at the output of OR gate 314 and 1 on the output of AND gate 317, since level indicating input lead C11L also has a 1 thereon.

The 1 from AND gate 317 passes through OR gate 318 and appears on output lead 319, indicating that the torque applied to the servo motor armature should be clockwise. In summary, the actual speed of the servo motor was too large, in a counterclockwise direction, for the existing column level and pack level, and the control circuit issued an instruction to slow down the motor by applying a clockwise torque.

If, on the other hand, the actual speed of the tape reel is less than a threshold velocity N4L, a 0 output will occur from AND gate 310 which will pass through OR gate 314 and AND gate 317 as a 0, and then will pass through OR gate 318 as a 0. Inverter 320 will invert the 0 at the sampling time to produce a 1 on the output lead 321, thereby instructing the control circuit of FIG. 19 (not yet described) to apply a torque to the motor in a counterclockwise direction.

(VIII) SCR control circuit means for the servo motor armature and direction of determining of circuit means (FIGS. 19, 20, and 21)

Referring now to FIG. 19, the circuit means within the dotted block 352 will decide the polarity and amplitude of the signal to be supplied to the servo motor armature. As indicated hereinbefore, the amplitude of the signal supplied to the armature will be one of two values, depending on which direction the torque is to be applied.

In accordance with the torque direction, which is determined within the circuit 352, either transformer driver 347 or transformer driver 348 will be energized by a trigger pulse appearing on input leads 353 and 354, respectively. Subsequently, the group of transformer primaries $T_1$ through $T_4$, or a second group of transformer primaries $T_5$ through $T_8$, will be energized and will function to energize the secondary windings and the silicon controlled rectifiers which are contained in the bridge circuit within the dotted block 351. Depending upon which group of transformer primary windings is energized, current will flow through the servo armature 272 either from right to left or left to right, as will be discussed later.

Returning again to the circuit within dotted block 352, amplitude decode pulses from FIG. 16 will appear on the lead 262′ (ACW) and 263′ (ACCW). A 1 will be applied to either the lead 319′ (DCW) or the lead 321′ (DCCW) depending on which direction the torque is to be applied. The leads 319′ and 321′ are, of course, extensions from leads 319 and 321 of FIG. 17. The lead 238′, also labeled sample pulse, is connected to lead 238 of FIG. 14.

When the sample pulse on lead 238′ occurs, either AND gate 358 or 359 will become conductive, depending on whether a 1 appears on the lead 319′ or 321′. Assume the 1 appears on lead 319′. AND gate 358 will then set the drive direction determining flip-flop 345 to produce a 1 on the output lead 356 thereof. When the trigger pulse from output lead 262 of FIG. 16 occurs it will pass through AND gate 344 and energize transformer driving circuit 347.

Transformer primaries $T_1$ through $T_4$ will then become energized and will drive secondary transformers $T_1'$ through $T_4'$ of the bridge circuit within dotted block 351. The silicon controlled rectifiers SCR1, SCR2, SCR3, and SCR4 will then become energized to permit a D-C current to flow through the armature 272 in the direction of arrow 360.

Assume now the case where the 1 appears on lead 321′ of AND gate 359. Under such circumstances flip-flop 345 will be reset and the AND gate 346 will pass a 1 to transformer driver 348, thus energizing transformer primary windings $T_5$ through $T_8$. The corresponding secondary transformer windings $T_5'$ through $T_8'$ of bridge circuit 351 will then become energized at the proper times during each half-cycle of the 60-cycle input signal to fire the silicon controlled rectifiers SCR5, SCR6, SCR7, and SCR8 and thereby produce a current through servo armature 272 in the direction of arrow 361. As discussed above, the pulses appearing on leads 262′ and 263′ determine the point in time in each half-cycle of the 60-cycle source 350 of FIG. 19 at which the SCR's are fired which, in turn, will determine the D-C voltage actually supplied to the armature 272.

Referring now to FIG. 20, there is shown in curve A a full cycle of the 60-cycle signal supplied from source 350 in FIG. 19. FIG. 20B shows the voltage impressed across servo armature 272 of FIG. 19 when the SCR's are fired at the count of four of the firing amplitude reference 50 of FIG. 3. The equivalent D-C voltage is indicated by the dotted line 365 in FIG. 20.

If the firing occurs at a higher count, as for example count twelve, as shown in FIG. 20C, the SCR's will not become energized until late in each half cycle, thus producing a smaller equivalent D-C voltage as indicated by the dotted line 366.

Referring again briefly to FIG. 3, there is shown a lead 56 extending from pack sense 50 to the sealed SCR control circuit 65, which circuit controls the voltage amplitudes supplied to the field of the servo motor 14'.

In FIG. 21 there is shown a more detailed logic diagram of the field SCR controlled circuit 65 of FIG. 3. In FIG. 21 there are a group of four AND gates 370 through 373, which function to pass output pulses from firing amplitude reference 50 of FIG. 3 in accordance with the pack density. For example, if the pack density is three-quarters full, then the timing pulse from output lead A81L from FIG. 14 is passed through AND gate 372 and OR gate 374 to fire the SCR's contained in the bridge circuit 375; thus providing the D-C voltage applied to the servo motor field winding 376. The bridge circuit 375 is similar to the bridge circuit 351 of FIG. 19, except that parallel SCR rectifiers are not utilized in each of the four legs of the bridge. More specifically, only one SCR and the associated secondary transformer winding is used in each of the four bridges of the legs so that the voltage applied across the motor field winding is always of the same polarity.

(IX) Discussion of the voltage applied to the servo motor armature versus the back EMF of said armature connected Throughout the discussion relating to the voltages supplied to the servo motor armatures nothing has yet been mentioned relating to the back EMF voltage which will exist in the armature any time that it is rotating. It will be apparent that the actual torque developed in the motor armature will be determined by both the applied voltage and the existing back EMF. Under steady state conditions the applied EMF will be greater than the back EMF and, of course, of opposite polarity, the absolute difference between the two voltages representing the energy consumed in motor losses and in driving the load. If the absolute value of the applied voltage is suddenly decreased to an absolute value less than the back EMF then the motor will be decelerated depending upon the amount of difference between the two absolute voltages.

For example, assume that the motor is rotating in a clockwise direction and has an applied voltage of a positive 81 volts across the armature thereof. Assume, further, that the back EMF created in the rotating armature is a −60 volts. The difference between the absolute values of the applied voltage and the back EMF voltage is 21 volts which is employed to overcome losses of various types in the motor and also to drive the load; e.g., the tapes and the tachometer disc. It might be noted that the conditions just described would actually exist when the tape was in the zero level of the vacuum column as indicated at the top of FIG. 16.

Assume that the tape suddenly drops to level one of the vacuum column 18 of FIG. 1. Assume, further, that the speed of the motor 14 is now greater than that required for the existing conditions, i.e., with the tape being in level one of the column and with a given pack density. Such being the conditions, the control circuits will require that a counterclockwise torque be applied to the motor armature. Referring now to FIG. 16, it can be seen that in the one level of the vacuum column, and with a counterclockwise torque desired, the amplitude of the voltage supplied to the motor is 8 volts, as indicated by the notation of the lead to AND gate 258. Such 8 volts is supplied with a polarity opposite to that of the 81 volts supplied when the tape was in the zero level. Thus the total applied voltage to the armature is equal to the 8 volts applied externally thereto plus the 60 volts of back EMF. It is being assumed for purposes of this discussion that the speed of the motor has not yet actually decreased. Thus the total voltage applied to the armature is a −68 volts, which produces a counterclockwise torque in the motor. As the motor slows, the back EMF will decrease, and thereby reduce the amount of counterclockwise torque applied. However, if the tape continues to drop in the vacuum column, as will occur when the capstan reverses, the applied voltage will become greater in a negative polarity, and will add to the back EMF until the motor armature slows to zero and reverses direction.

When reversal of direction occurs, the polarity of the back EMF will also change and will become positive, and thus subtract from the applied voltage. The net result, however, will still be to produce a counterclockwise rotation of the motor as the tape continues to drop in the column.

As the tape nears the bottom of the column the motor speed increases and the back EMF, which is now of a positive polarity, becomes increasingly larger as does the applied voltage which is negative in polarity at this point.

A condition of stability is reached between the 11th and 12th column levels where the applied voltage is sufficiently greater than the back EMF to maintain the speed of the motor sufficient to extract tape from the vacuum column approximately as fast the capstan feeds it in.

It is to be noted that absolute stability of the servo motor speed is not obtained. The values of the applied servo armature voltages are selected so that when the tape is in level 12, the applied voltage will drive the tape reel a little faster than required to maintain a steady level of tape in the column. Thus the tape will begin to rise and when it reaches the 11th level the servo motor will be braked slightly so that its speed will fall just below that required to maintain the tape level constant.

The tape will then fall back into the 12th level at which time the cycle will be repeated.

It can be seen that the tape level will oscillate between the 11th and 12th levels in the steady state condition. If the capstan should again reverse to a clockwise direction the tape will rise rapidly in the column level and braking and reversal of direction of the motor will again occur.

It is to be understood that the form of the invention shown and described herein is but a preferred embodiment thereof and that various changes may be made in circuit logic employed and in the mechanical configurations utilized, such as the sensing devices, without departing from the spirit and the scope thereof.

I claim:

1. In a tape transport having capstan means and first and second take-up tape reel means upon which the tape is wound, a servomechanism control means for regulating the angular velocity of said tape reel means and comprising:

first tape buffer storage means positioned between said capstan means and said first tape reel means, with respect to said flow of tape;

first tape storage sensing means responsive to the amount of tape stored in said first tape buffer storage means to produce a first tape storage sensing signal;

first pack density sensing means responsive to the amount of tape stored on said first tape reel means to produce a first pack density sensing signal;

first angular velocity sensing means responsive to the angular velocity of said first tape reel means to produce a first angular velocity sensing signal and a first angular velocity direction sensing signal;

first servo motor means for driving said first tape reel means in either direction and with predetermined accelerating torques in response to first control signals supplied thereto;

a controllable power supply comprising an AC signal source of generating an AC signal;

first digital logic control circuits responsive to said first tape storage sensing signal, said first pack density sensing signal, said first angular velocity sensing signal and said first angular velocity direction sensing signal to produce said first control signals for controlling said controllable power supply to supply to said first servo motor means a voltage of an amplitude and polarity to control the velocity and direction of rotational torque of said servo motor and thereby the amount of tape stored in said first tape buffer storage means in accordance with preprogrammed relative values of said first tape storage sensing signal, said first pack density sensing signal, said first angular velocity sensing signal, and said first angular velocity direction sensing signal;

counting means responsive to the zero crossover of said AC signal to count to a predetermined count Q during each half cycle of said AC signal to divide each half cycle into Q substantially equal time intervals with reference pulses separating said time intervals; and amplitude decode gating means responsive to the output of said first tape storage sensing signal and a particular predetermined one of said reference pulses to provide a first amplitude control signal for controlling the magnitude of the output of said controllable power supply when the torque to be generated by said servo motor means is to be in a clockwise direction;

said amplitude decode gating means further responsive to said first tape storage sensing signal and another predetermined one of said reference pulses to provide a second amplitude control signal for controlling the magnitude of the output of said controllable power supply when the torque to be generated in said servo motor is to be in a counterclockwise direction.

2. A tape transport means in accordance with claim 1 in which said first tape buffer storage means comprises:

a vacuum column into which the tape is stored;

said tape storage sensing means comprising a plurality of sensors arranged along the sides of said vacuum column to detect the tape level in said vacuum column in M discrete steps.

3. A tape transport means in accordance with claim 2 in which said angular velocity sensing means comprises:

disc means with apertures formed therein;

said disc means constructed to rotate at an angular velocity bearing a constant ratio to the angular velocity of said first tape reel;

sensor means positioned adjacent said apertures and constructed to generate said angular velocity sensing signals indicative of the angular velocity of said disc means in N discrete steps and indicative of the direction of angular velocity of said disc means.

4. A tape transport means in accordance with claim 3 in which said first pack density sensing means comprises:

optical means for emitting a plurality of focused, parallel light beams in a plane normal to the rotational axis of said first tape reel means and passing between the sides of said tape reel;

sensor means responsive to each of said light beams to produce signals indicative of each light beam impinging thereon;

said optical means and said sensor means being positioned so that varying numbers of said light beams will be intercepted in accordance with the amount of tape on said tape reel and thereby will indicate, in one of P discrete steps, the amount of tape on said first tape reel means.

5. A tape transport in accordance with claim 4 in which said digital logic control circuits further comprise:

direction drive decode gating means having desired threshold angular velocities of said servo motor means preprogrammed therein and responsive to selected combinations consisting of one of the N angular velocity sensing signals, one of the P pack density sensing signals, and one of the M tape storage sensing signals, to compare the actual angular velocity of said servo motor means with the desired angular velocity preprogrammed in said direction drive decode gating means to determine in which angular direction the torque should be generated within said servo motor means.

6. In a tape transport having capstan means and first and second take-up tape reel means upon which the tape is wound, a servomechanism control means for regulating the angular velocity of said tape reel means and comprising:

first tape buffer storage means positioned between said capstan means and said first tape reel means with respect to said flow of tape;

first tape storage sensing means responsive to the amount of tape stored in said first tape buffer storage means to produce a first tape storage sensing signal;

first angular velocity sensing means responsive to the angular velocity of said first tape reel means to produce a first angular velocity sensing signal and a first angular velocity direction sensing signal;

first servo motor means for driving said first tape reel means in either direction and with predetermined accelerating torques in response to first control signals supplied thereto;

a controllable power supply comprising an A-C signal course for generating an A-C signal;

first digital logic control circuit means responsive to said first tape storage sensing signal, said first angular velocity sensing signal and said first angular velocity direction sensing signal to produce said first control signals for controlling said controllable power to supply to said servo motor a voltage of an amplitude and polarity to control the velocity and direction of rotational torque of said servo motor means and thereby the amount of tape stored in said first tape buffer storage means in accordance with preprogrammed relative values of said first tape storage sensing signal, said first angular velocity sensing signal, and said first angular velocity direction sensing signal;

said first digital logic control circuits comprising:

counting means responsive to the zero crossover of said A-C signal source to count to a predetermined count Q during each half cycle of said A-C signal to divide each half cycle into Q substantially equal time intervals with reference pulses separating said time intervals;

amplitude decode gating means responsive to the output of said first tape storage sensing signal and a particular one of said predetermined reference pulses to provide a first amplitude control signal for controlling the magnitude of the output of said controllable power supply when the torque to be generated by said servo motor means is to be in a clockwise direction;

said amplitude decode gating means further responsive to said first tape storage sensing signal and another one of said predetermined reference pulse to provide a second amplitude control signal for controlling the magnitude of the output of said controllable power supply when the torque to be generated in said servo motor is to be in a counterclockwise direction.

7. A tape transport means in accordance with claim 6 in which said first tape buffer storage means comprises:

a vacuum column into which the tape is stored;

said first tape storage sensing means comprising a plurality of sensors arranged along the sides of said vacuum column to detect the tape level in said vacuum column in M discrete steps.

8. A tape transport means in accordance with claim 7 in which said angular velocity sensing means comprises:
disc means with slots formed therein;
said disc means constructed to rotate at an angular velocity bearing a constant ratio to the angular velocity of said first tape reel;
sensor means positioned adjacent said slots and constructed to generate said first angular velocity indicating signals indicative of the angular velocity of said disc means in N discrete steps and indicatve of the direction of angular velocity of said disc means.

9. A tape transport in accordance with claim 8 comprising:
first direction decoding means responsive to the actual angular velocity of said first servo motor means and said first tape storage sensing signal, to compare said actual angular velocity with the desired angular velocity preprogrammed therein to determine the angular direction of the torque to be generated in said servo motor means.

10. A tape transport in accordance with claim 9 in which said first digital logic circuits further comprise:
direction drive decode gating means having desired threshold angular velocities of said servo motor means preprogrammed therein and responsive to selected combinations consisting of one of the N angular velocity sensing signals, one of the P pack density sensing signals, and one of the M tape storage sensing signals, to compare the actual angular velocity of said servo motor means with the desired angular velocity preprogrammed in said direction drive decode gating means to determine in which angular direction the torque should be generated within said servo motor means.

References Cited

UNITED STATES PATENTS

| | | | |
|---|---|---|---|
| 2,214,332 | 9/1940 | Kline | 242—55.14 |
| 2,283,121 | 5/1942 | Michel | 242—75.52 |
| 3,005,582 | 10/1961 | Brede. | |
| 3,203,635 | 8/1965 | Rayfield et al. | |
| 3,259,330 | 7/1966 | Baybick et al. | |
| 3,304,018 | 2/1967 | Kurth. | |
| 3,345,008 | 10/1967 | Jacoby. | |

GEORGE F. MAUTZ, *Primary Examiner.*

UNITED STATES PATENT OFFICE
CERTIFICATE OF CORRECTION

Patent No. 3,454,960 July 8, 1969

Marold H. Lohrenz

It is certified that error appears in the above identified patent and that said Letters Patent are hereby corrected as shown below:

Column 10, line 17, cancel "to level C12L". Column 12, line 29, "tape" should read -- taps --; line 33, "resistors" should read -- resistor --. Column 14, line 18, "and" should read -- are --. Column 20, line 75, "of" should read -- for --. Column 22, line 29, "course" should read -- source --.

Signed and sealed this 21st day of April 1970.

(SEAL)
Attest:

Edward M. Fletcher, Jr.
Attesting Officer

WILLIAM E. SCHUYLER, JR.
Commissioner of Patents